US008098395B2

(12) United States Patent
Kitada et al.

(10) Patent No.: US 8,098,395 B2
(45) Date of Patent: Jan. 17, 2012

(54) SYSTEM AND METHOD FOR IMAGE THUMBNAIL/PREVIEW ON AN IMAGE PROCESSING DEVICE

(75) Inventors: Hiroshi Kitada, Tuckahoe, NY (US);
Helen Wang, Whippany, NJ (US);
Weiyun Tang, Livingston, NJ (US);
Andrew Jennings, Boonton, NJ (US);
Shen Xu, Shanghai (CN)

(73) Assignees: Ricoh Company, Ltd, Tokyo (JP);
Ricoh Americas Corporation, West Caldwell, NJ (US)

( * ) Notice: Subject to any disclaimer, the term of this patent is extended or adjusted under 35 U.S.C. 154(b) by 1327 days.

(21) Appl. No.: 11/729,850

(22) Filed: Mar. 30, 2007

(65) Prior Publication Data
US 2008/0239329 A1 Oct. 2, 2008

(51) Int. Cl.
*G06K 15/00* (2006.01)
*G06F 3/12* (2006.01)
(52) U.S. Cl. ........................................ 358/1.18; 358/1.1
(58) Field of Classification Search .................... 358/1.1, 358/1.7, 1.8, 1.9, 1.12, 1.14, 1.15, 452, 537
See application file for complete search history.

(56) References Cited

U.S. PATENT DOCUMENTS

| | | | | |
|---|---|---|---|---|
| 6,285,461 | B1 * | 9/2001 | Fujii et al. | 358/1.18 |
| 6,473,539 | B1 * | 10/2002 | Koga | 382/317 |
| 7,064,858 | B2 * | 6/2006 | Iwai et al. | 358/1.2 |
| 7,188,316 | B2 * | 3/2007 | Gusmorino et al. | 715/764 |
| 7,535,591 | B2 * | 5/2009 | Kujirai | 358/1.16 |
| 2002/0052897 | A1 * | 5/2002 | Nishikawa et al. | 707/527 |
| 2004/0126122 | A1 * | 7/2004 | Kanamoto et al. | 399/20 |
| 2004/0184101 | A1 * | 9/2004 | Hamilton et al. | 358/1.15 |
| 2004/0216058 | A1 * | 10/2004 | Chavers et al. | 715/810 |
| 2005/0039126 | A1 * | 2/2005 | Katano | 715/700 |
| 2005/0117773 | A1 * | 6/2005 | Kobayashi | 382/100 |
| 2005/0179961 | A1 * | 8/2005 | Czyszczewski et al. | 358/468 |
| 2007/0139741 | A1 * | 6/2007 | Takami et al. | 358/527 |
| 2007/0216973 | A1 * | 9/2007 | Tagawa | 358/527 |

* cited by examiner

*Primary Examiner* — Gabriel Garcia
(74) *Attorney, Agent, or Firm* — Oblon, Spivak, McClelland, Maier & Neustadt, L.L.P.

(57) ABSTRACT

An image processing device and method for modifying images on an image processing device including a scanner configured to produce an image of at least one document having multiple pages, a communications interface configured to connect the image processing device to a server via a network, a display unit configured to display a preview image or a thumbnail image of at least one of the pages of the scanned document and a user interface configured to display a selectable graphical indicia corresponding to at least one operation for modifying the preview image or the at least one image of the scanned document.

29 Claims, 41 Drawing Sheets

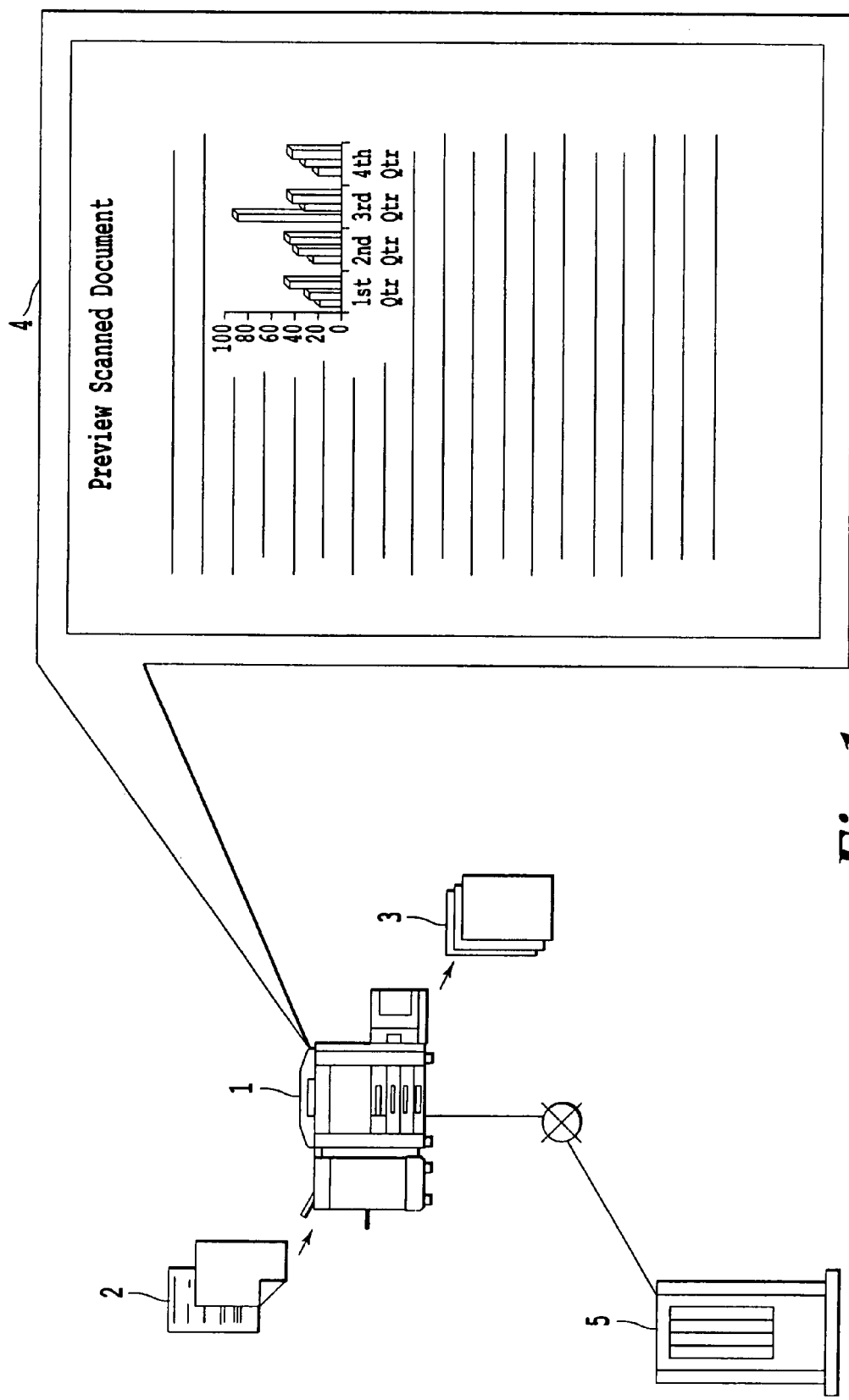

```
1   <screen_data>
2       <options>
3           <item>
4               <item_name default="1">None</item_name>
5               <item_value>0</item_value>
6           </item>
7           <item>
8               <item_name default="0">All</item_name>
9               <item_value>all</item_value>
10          </item>
11          <item>
12              <item_name default="0">First 5</item_name>
13              <item_value>F5</item_value>
14          </item>
15          <item>
16              <item_name default="0">Last 3</item_name>
17              <item_value>L3</item_value>
18          </item>
19          <item>
20              <item_name default="0">First 3, Last 2</item_name>
21              <item_value>F3,L2</item_value>
22          </item>
23      </options>
24          <localization>
25              <preview type="text">Preview</preview>
26              <thumbnail_widthtype="text">
27                  ThumbNail Width
28              <thumbnail_width>
29              <thumbnail_height type="text">
30                  ThumbNail Height
31              <thumbnail_height>
32              <page_select type = "text">Page Range<page_select>
33              <thumbnail_title type= "text">
34                  Thumbnail Select
35              </thumbnail_title>
```

*Fig. 14A*

```
1      <thumbnail_pages type="text">
2          Pages
3      </thumbnail_pages>
4      <thumbnail_restore type="text"/"image">
5          Restore
6      </thumbnail_restore>
7      <thumbnail_cancel type="text"/"image">
8          Cancel
9      </thumbnail_cancel>
10     <thumbnail_submit type="text"/"image">
11         Submit
12     </thumbnail_submit>
13     <page_information type="text">
14         Page Information
15     </page_information>
16     <page_size type="text">
17         Size
18     <page_size>
19     <page_color_mode type="text">
20         Color Mode
21     </page_color_mode>
22     <preview_back type="text"/"image">
23         Back
24     </preview_back>
25     <preview_previous type="text"/"image">
26         Previous
27     </preview_previous>
28     <preview_next type="text"/"image">
29         Next
30     </preview_next>
31   <preview_rotate_clockwise type="text"/"image">
32         Rotate Clockwise
33   </preview_preview_rotate_clockwise>
34   <preview_rotate_anticlockwise type="text"/"image">
35         Rotate Anti Clockwise
```

*Fig. 14B*

```
1      </preview_preview_rotate_anticlockwise>
2      <preview_zoomin type="text"/"image">
3          Zoom In
4      <preview_zoomin>
5      <preview_zoomout type="text"/"image">
6          Zoom Out
7      <preview_zoomout>
8      <preview_delete type="text"/"image">
9          Delete
10     <preview_delete>
11    </localization>
12   <zoom_levels>
13       <zoom_value>20</zoom_value>
14       <zoom_value>30</zoom_value>
15       <zoom_value>60</zoom_value>
16       <zoom_value>90</zoom_value>
17       <zoom_value>100</zoom_value>
18   </zoom_levels>
19 </screen_data>
```

*Fig. 14C*

```
1   <root>
2       <error_code/>
3       <error_description/>
4       <primary/>
5       <secondary/>
6       <server_status/>
7       <total_page_number>25</total_page_number>
8       <page_number>2</page_number>
9       <thumbnail_only>1</thumbnail_only>
10      <data type="thumbnail" id="1" pagetype="********">
11          <bmpdata>XXXXXXXXXXXXXXXXXXXXXXX<
12          /bmpdata>
13      </data>
14      <data type="thumbnail" id="2" pagetype="********">
15          <bmpdata>XXXXXXXXXXXXXXXXXXXXXXX<
16          /bmpdata>
17      </data>
18  </root>
```

*Fig. 18B*

```
1   HTTP{S}://server{:port}/GSClient/APISessionMgr.aspx?
2   action=preview&action_input=op=rotate
3   &image_no=
4   °rees=
5   &request_image=
6   &zoom=
7   &follow_me=
8
9
10  <root>
11      <error_code/>
12      <error_description/>
13      <primary/>
14      <secondary/>
15      <server_status/>
16      <thumbnail_only>0</thumbnail_only>
17      <data type="thumbnail" id="1" >
18          <bmpdata>XXXXXXXXXXXXXXXXXXXXXXXX<
19          /bmpdata>
20      </data>
21      <data type="preview" id="1" width="80" height="100"
22      zoom_init="30" pagetype="************">
23          <bmpdata>XXXXXXXXXXXXXXXXXXXXXXXX<
24          /bmpdata>
25      </data>
26
```

*Fig. 19B*

```
1   HTTP{S}://server{:port}/GSClient/APISessionMgr.aspx?
2   action=preview&action_input=op=get
3   &image_no=
4   &zoom=
5   &sizeX=
6   &sizeY=
7   &request_image=
8   &direction=
9
10  <root>
11        <error_code/>
12        <error_description/>
13        <primary/>
14        <secondary/>
15        <server_status/>
16        <thumbnail_only>0</thumbnail_only>
17        <data type="preview" id="1" width="80" height="100"
18        zoom_init="30" pagetype="********">
19             <bmpdata>XXXXXXXXXXXXXXXXXXXXXXXXX<
20             /bmpdata>
21        </data>
22        <data type="thumbnail" id="1">
23             <bmpdata>XXXXXXXXXXXXXXXXXXXXXXXXX<
24             /bmpdata>
25        </data>
26  </root>
```

*Fig. 20B*

```
1   HTTP{S}://server{:port}/GSClient/APISessionMgr.aspx?
2   action=preview&action_input=op=get
3   &image_no=
4   &zoom=
5   &sizeX=
6   &sizeY=
7   &request_image=
8   &direction=
9
10  <root>
11      <error_code/>
12      <error_description/>
13      <primary/>
14      <secondary/>
15      <server_status/>
16      <thumbnail_only>0</thumbnail_only>
17      <data type="preview" id="1" width="80" height="100"
18      zoom_init="30" pagetype="********">
19          <bmpdata>XXXXXXXXXXXXXXXXXXXXXXXX
20          </bmpdata>
21      </data>
22  </root>
```

*Fig. 21B*

```
1   HTTP{S}://server{:port}/GSClient/APISessionMgr.aspx?
2   action=preview&action_input=
3       op=delete
4       &image_no=
5
6   <root>
7       <error_code/>
8       <error_description/>
9       <primary/>
10      <secondary/>
11      <server_status/>
12      <thumbnail_only>0</thumbnail_only>
13      <data type="preview" id="1" width="80" height="100"
14      zoom_init="30" pagetype="3">
15          <bmpdata>XXXXXXXXXXXXXXXXXXXXXXX
16          X</bmpdata>
17      </data>
18  </root>
```

*Fig. 22B*

```
1   HTTP{S}://server{:port}/GSClient/APISessionMgr.aspx?
2   action=preview&action_input=op=get
3   &image_no=
4   &zoom=
5   &sizeX=
6   &sizeY=
7   &request_image=
8   &direction=
9
10  <root>
11      <error_code/>
12      <error_description/>
13      <primary/>
14      <secondary/>
15      <server_status/>
16      <thumbnail_only>0</thumbnail_only>
17      <data type="preview" id="1" width="80" height="100"
18      zoom_init="30" pagetype="********">
19          <bmpdata>XXXXXXXXXXXXXXXXXXXXXXXX
20          X</bmpdata>
21      </data>
22      <data type="thumbnail" id="1">
23          <bmpdata>XXXXXXXXXXXXXXXXXXXXXXXX
24          X</bmpdata>
25      </data>
26  </root>
```

*Fig. 23B*

```
1   HTTP{S}://server{:port}/GSClient/APISessionMgr.aspx?
2   action=preview &action_input=  op = set
3
4   HTTP{S}://server{:port}/GSClient/APISessionMgr.aspx?
5   action=preview &action_input= op = cancel
6
7   HTTP{S}://server{:port}/GSClient/APISessionMgr.aspx?
8   action=preview &action_input= op = restore
9
10      <root>
11          <error_code/>
12          <error_description/>
13          <primary/>
14          <secondary/>
15          <server_status/>
16          <total_page_number>25</total_page_number>
17          <page_number>2</page_number>
18          <thumbnail_only>1</thumbnail_only>
19          <data type="thumbnail" id="1" pagetype="********">
20              <bmpdata>XXXXXXXXXXXXXXXXXXXXXXXX
21              X</bmpdata>
22          </data>
23          <data type="thumbnail" id="2" pagetype="********">
24              <bmpdata>XXXXXXXXXXXXXXXXXXXXXXXX
25              X</bmpdata>
26          </data>
27      </root>
28
```

*Fig.24B*

SYSTEM AND METHOD FOR IMAGE THUMBNAIL/PREVIEW ON AN IMAGE PROCESSING DEVICE

BACKGROUND OF THE INVENTION

1. Field of the Invention

The present invention relates to a system and method for image thumbnail/preview on an image processing device.

2. Description of the Related Art

The present inventors have determined that users of conventional multifunction devices are unable to determine until after printing or saving if a scan on a multifunction device had been successful or if the input pages need to be scanned again. In addition, the inventors have determined that users of conventional devices are unable to verify the scan quality of the job and verify things such as barcodes, signatures, anti-copying marks or watermarks that developed on the scan.

SUMMARY OF THE INVENTION

The present invention provides, inter alia, a method of modifying images including the steps of scanning at least one document having multiple pages, displaying a thumbnail image of at least one of the pages of the scanned document, displaying a selectable graphical indicia corresponding to at least one operation for modifying at least one image of the scanned document, selecting the selectable graphical indicia and modifying the at least one image in accordance with said selecting.

Also included in the present invention is a method that includes scanning at least one document having multiple pages, displaying a preview image of at least one of the pages of the scanned document, displaying a selectable graphical indicia corresponding to at least one operation for modifying the preview image, selecting the selectable graphical indicia and modifying the preview image in accordance with said selecting.

BRIEF DESCRIPTION OF THE DRAWINGS

Other objects, features and advantages of the present invention will become more apparent from the following detailed description when read in conjunction with the accompanying drawings, in which:

FIG. 1 is a diagram showing an overview of the relationship between input documents, a multi-function device, a document preview, output documents and a server according to an exemplary embodiment of the present invention;

FIGS. 14A-C are an example of the return xml sent from the server to the MFD in response to an API Get Available Services query from the MFD;

FIG. 18B illustrates the return XML data sent by the server in response to the initialization request;

FIG. 19B illustrates the rotate request syntax and the return XML data sent by the server in response to the rotate request;

FIG. 20B illustrates the zoom request syntax and the return XML data sent by the server in response to the zoom request;

FIG. 21B illustrates the pan request syntax and the return XML data sent by the server in response to the pan request;

FIG. 22B illustrates the delete request syntax and the return XML data sent by the server in response to the delete request;

FIG. 23B illustrates the next/previous request syntax and the return XML data sent by the server in response to the next/previous request;

FIG. 24B illustrates the submit, cancel or restore request syntax and the return XML data sent by the server in response to the submit, cancel or restore request.

DETAILED DESCRIPTION OF THE PREFERRED EMBODIMENTS

Figure 2A:
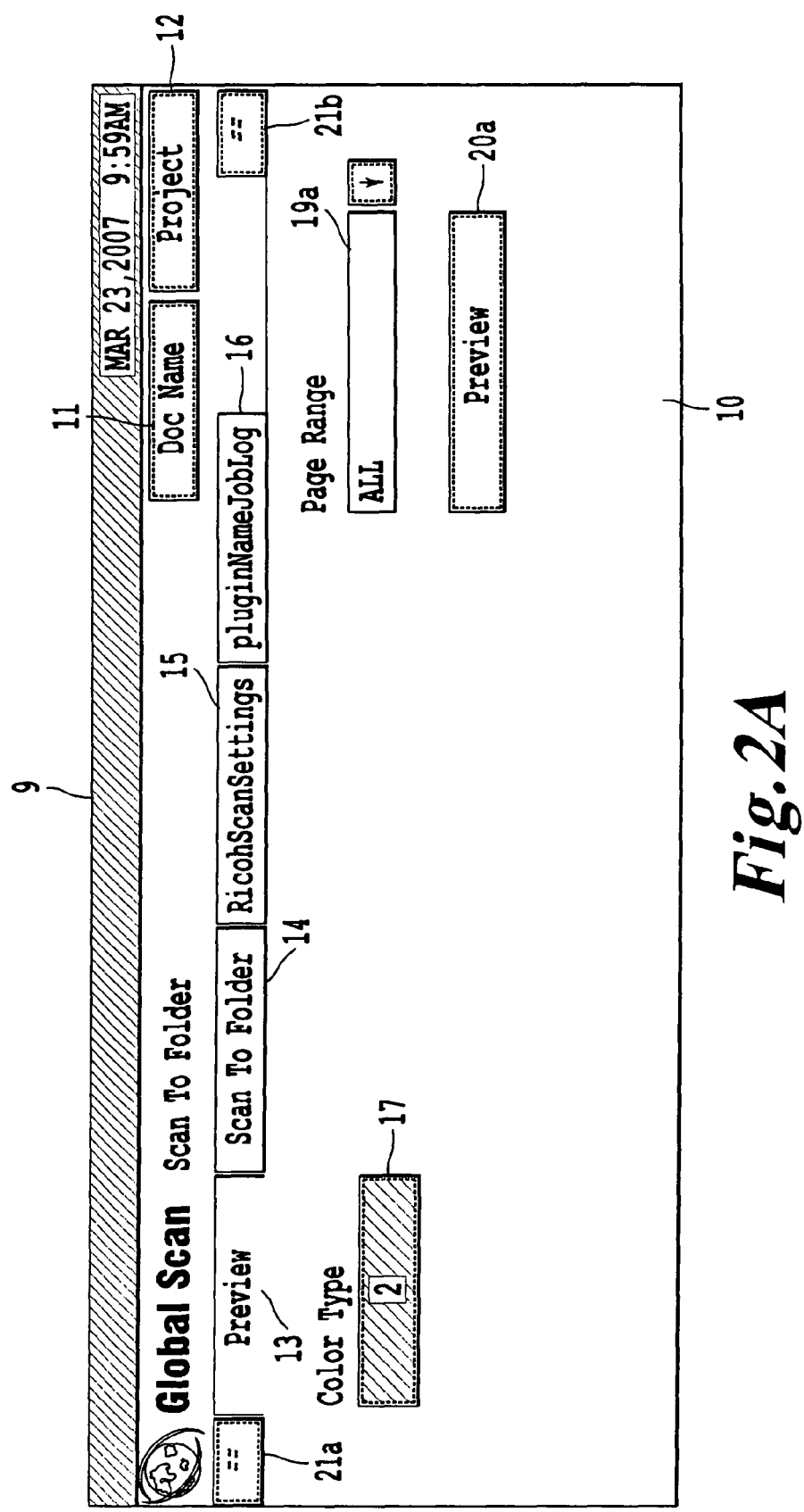
FIG. 2A shows an exemplary MFD main window in addition to an exemplary preview page including a preview button.

Referring now to the drawings, wherein like reference numerals designate identical or corresponding parts throughout the several views and more particularly to FIG. 1 thereof, there is illustrated a typical example in which input documents 2 are input into a multi-functional device 1 which delivers output documents 3. An embodiment of the present invention enables a preview of the input document 2 before it is output as an output document 3 or sent to a GlobalScan server 5. The preview image 4 of the scanned input documents 2 enables the user to easily review the scan of the input document 2. Additionally, if the GlobalScan server 5 is being used along with the multifunction device 1, the image preview allows the user to review multiple scanned images before a job is committed to the Global Scan server 5 for final processing. The GlobalScan server 5 serves as a digital document routing system that accepts, organizes and controls scanned documents in addition to creating digital files for electronic transmission or for storage. Further, information on the GlobalScan server 5 and system can be found in related application Ser. No. 11/092,831, "System and Method for Authenticating a User of an Image Processing System," filed Mar. 30, 2005, Ser. No. 11/092,836, "System and Method for Managing Documents with Multiple Network Applications," filed Mar. 30, 2005 and U.S. Ser. No. 11/092,829, "System and Method for Compensating for Resource Unavailability in an Image Processing System," filed Mar. 30, 2005, each of which is incorporated herein by reference.

According to an embodiment of the present invention, a user previews an input document 2 on the multi-function device 1 before it is submitted to the GlobalScan server 5 for final processing. It should be noted that, according to an embodiment of the invention, the image preview features of the multi-function device 1 ("MFD") maybe the same, even if different devices are used for processing the preview operations. The MFD 1 may be used to locally handle the preview operations. Alternatively, the GlobalScan server 5 may be used to perform each operation in the preview process that is performed before final submission. In addition, the administrator is able to activate and de-activate the preview/thumbnail function on the MFD 1 remotely and the administrator can determine if the preview function's operations will be performed using the GlobalScan server 5 or the MFD 1.

The user interface for operating the image thumbnail/preview function on the multifunction device will now be described with reference to FIGS. 2A-C.

FIG. 2A illustrates a preview page 10 which is displayed below a GlobalScan main window 9. The preview page 10 is displayed when a user selects a project and then selects or presses a preview tab 13, which is located on the GlobalScan main window 9. Also included in the GlobalScan main window 9 are a scan to folder tab 14, a scan settings tab 15, a job log tab 16, a document name button 11, a project button 12 and scroll buttons 21a and 21b. The scroll buttons 21a and 21b are used to scroll between available tabs if there are a greater number of tabs then there is space available on the display window. The document name button 11 allows the user to change the name of the input document 2 being scanned. The project button 12 allows the user to exit the currently selected project and select a new project. The Email tab 14 allows the user to scan to email. The Scan settings tab 15 allows the user to change the localized settings for the scan such as resolution etc. The job log tab 16 allows the user to see a list of previously preformed scan jobs on the MFD 1.

As noted earlier, when the preview tab 13 is pressed on the GlobalScan main window 9 the preview window 10 is displayed. The preview window 10 includes a preview button 20a. In order to perform the preview function the preview button 20a is preferably, although not necessarily, highlighted. The preview button 20a is placed into and out of a highlighted state by pressing or clicking the preview button 20a. If the preview button 20a is pressed before a scan job is commenced, after the scan job is completed the preview function will be started automatically. If the preview button 20a is not selected the preview function will not be performed. FIG. 2B shows an example of when the preview button 20a is highlighted.

Also included on the preview window 10 is the preview page range dropdown box 19a. The preview page range dropdown box 19a enables the user to select how many of the input document's pages he/she desires to preview. The options that are available to the user are pre-set on the server side, for example. In the example illustrated in FIG. 2A, the optional "all" is selected in the preview page range drop-down box 19a. However, in FIG. 2B the option "none" is selected in the preview page range dropdown box 19a. FIG. 2C shows all of the options in this example that are available in the preview page range dropdown box 19a. In this example, the options are "none", "all", "first page only", "first five pages" or "last page only". However, other types of restrictions on the number of pages that are shown may also be set.

On the left side of the preview window 10 of FIG. 2A there is included a color type button 17. In this example, the color type button shows a value of 2. Thus, the color type portion of the preview window 10 enables the user to select the thumbnail's color type.

When the image preview functions are engaged and the user selects the start button initiating a scan, the MFD 1 scans the input document, uploads the job to the server 5, retrieves thumbnails and displays them, as is described below with respect to FIGS. 3 and 4. According to one embodiment, the server 6 preferably generates thumbnails only for the scanned pages the user has selected in the preview page range drop-down box 19a. Alternatively, the system may be able generate thumbnails for any or all scanned pages in the job. In this embodiment, the operations that are performed by the user on the preview images are performed only on those selected pages that the user previews. However, when the preview is accepted, all pages in the scan job are sent to the job monitor, even though only the pages that were previewed were changed. Alternatively, the user may be able to make a change to one previewed page and apply this change to each page or a number of selected pages, even if the page or pages were not previewed by the user.

Figure 3A:
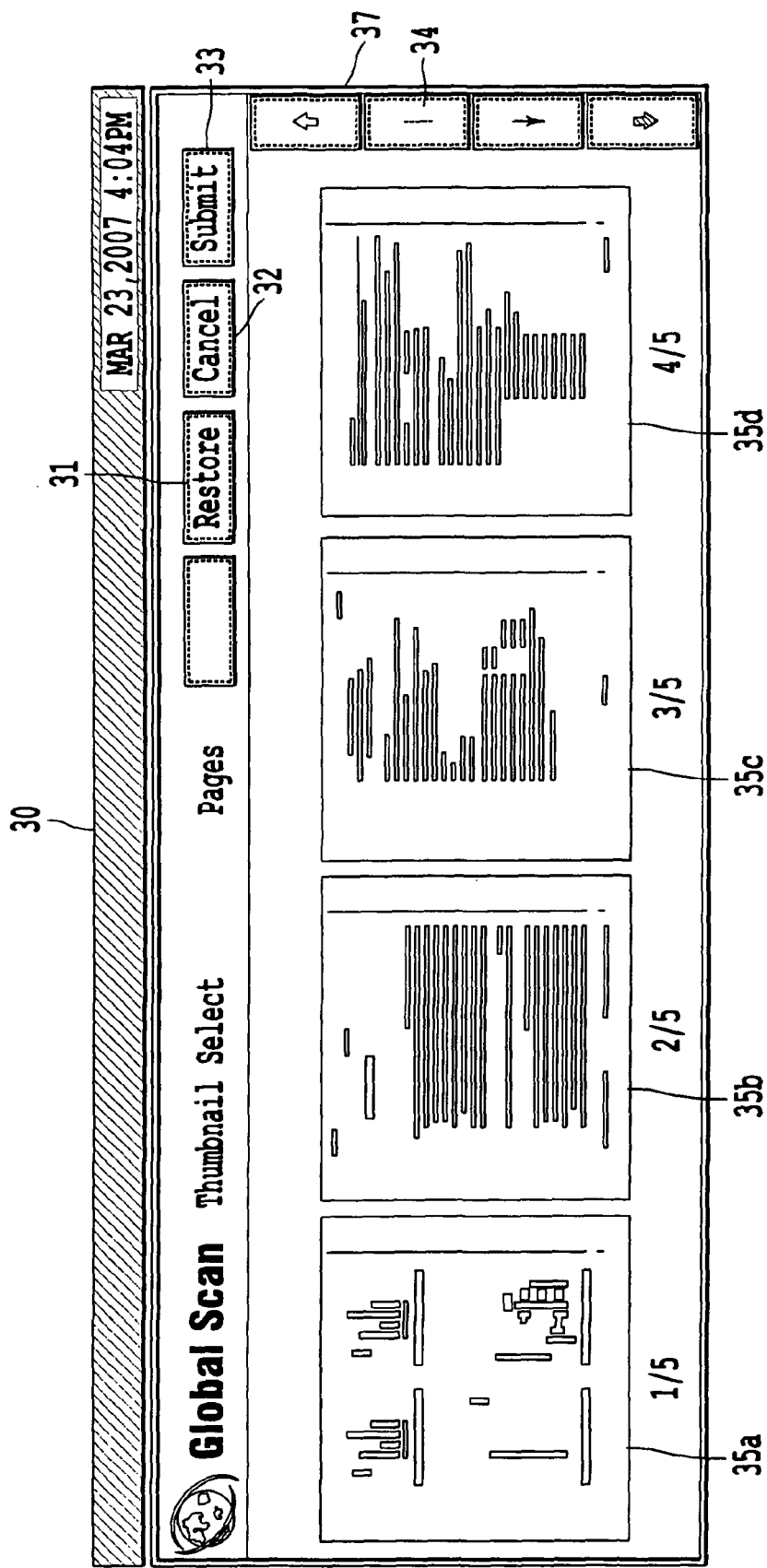
FIG. 3A shows an exemplary Thumbnail selection window.

FIG. 3A illustrates a thumbnail selection window 34 which is displayed after the preview button 20A is highlighted and a scan job is performed. The thumbnail selection window 34 includes a number of thumbnails which each represent one of the scanned pages or images of the scan job performed on the MFD 1. In one embodiment, the thumbnail size is predetermined and stored in the MFD 1. Alternatively in another embodiment the thumbnail size may be determined by settings on the GlobalScan server 5. As shown in thumbnail window 34, thumbnails 35A-35D are selectable icons which the user can select to further process the specified page or image of the current scan job. If a user's scan job includes only one document, the thumbnail selection window 34 will not be shown according to one embodiment.

In addition to a number of thumbnails, the thumbnail selection window 34 includes a scroll bar 37 which, when pressed or selected, shows additional image thumbnails that could not be shown in the display window. FIG. 4 shows the additional thumbnail 35E that could not be shown in the original window in FIG. 3A. In order to return to the window shown in FIG. 3A, an up button on the scroll bar 37 may be used.

Figure 4:
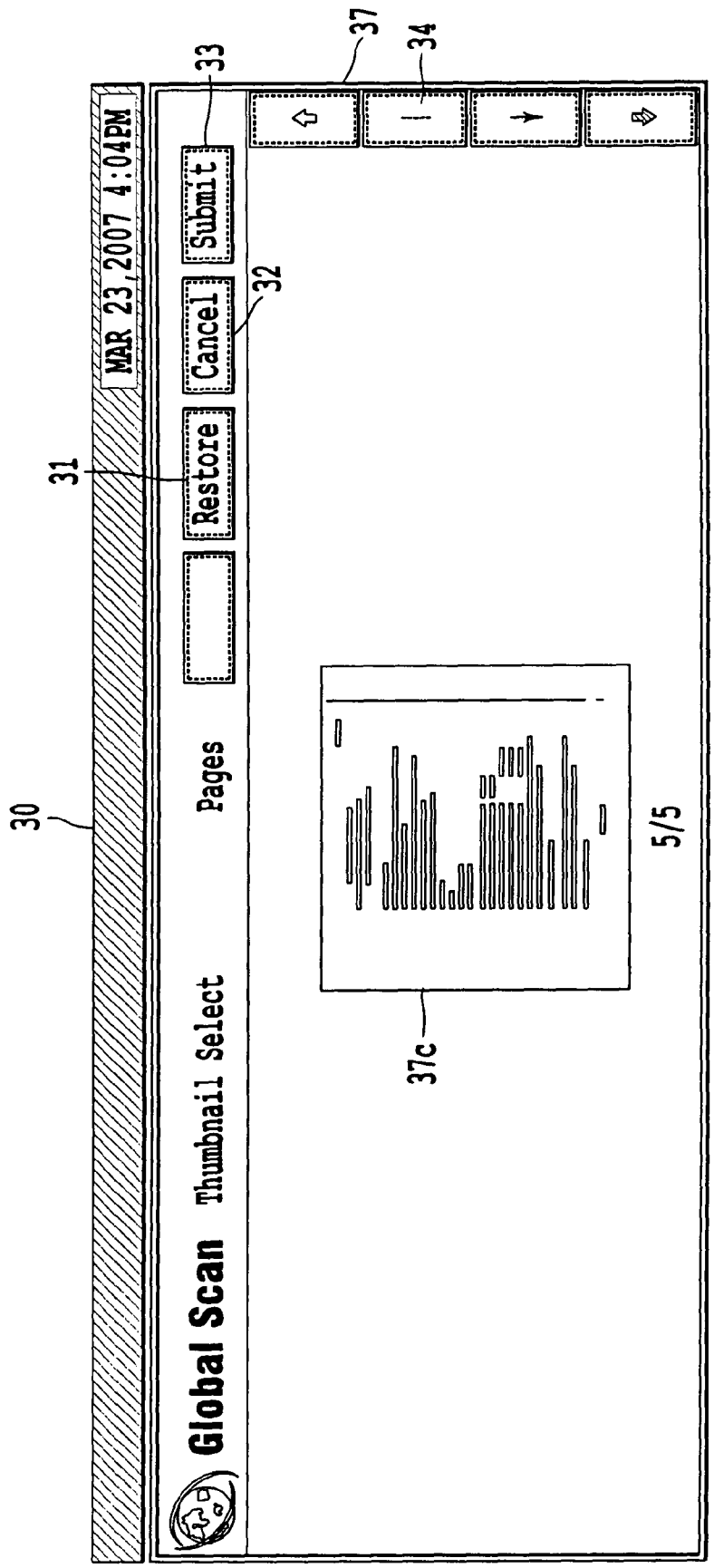
FIG. 4 shows a second exemplary Thumbnail selection window.
Figure 5:
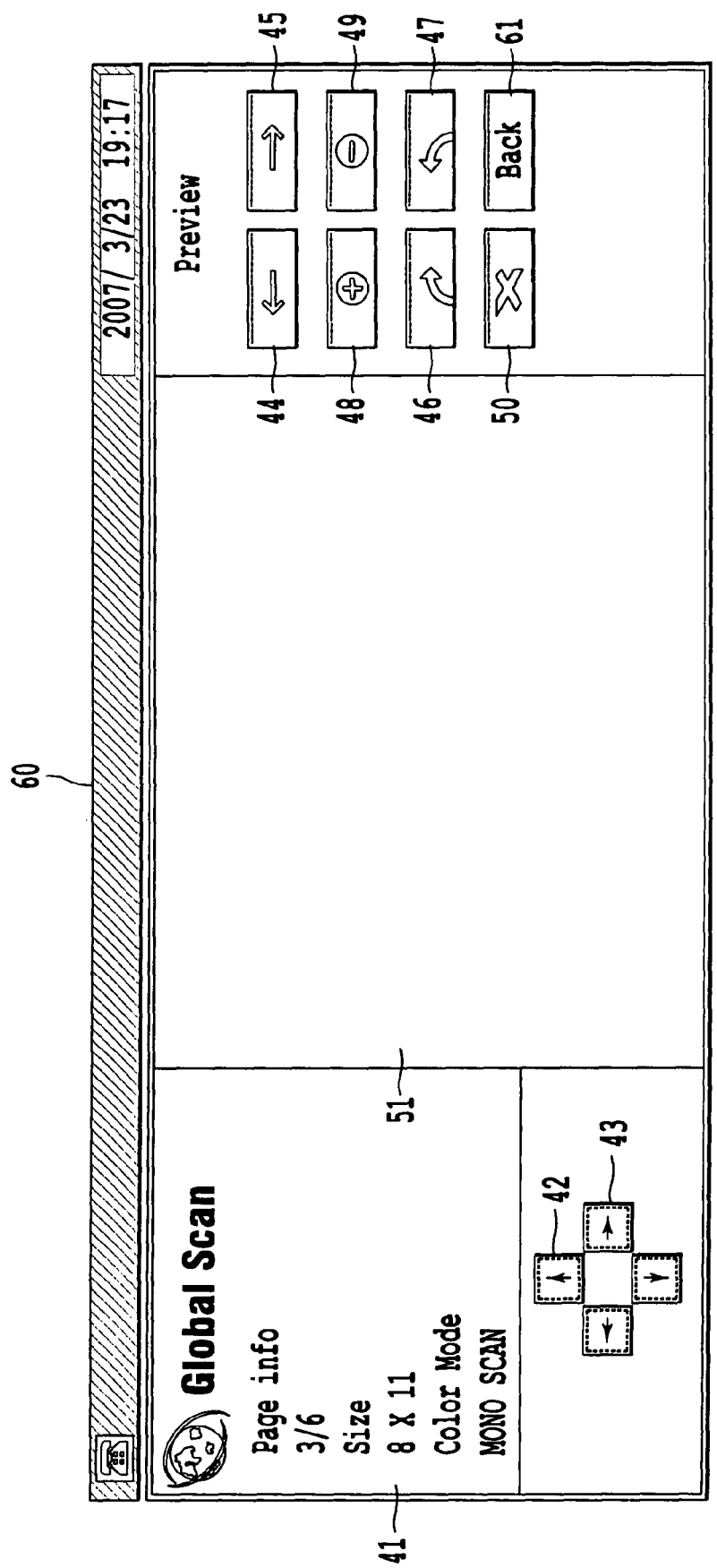
FIG. 5 shows an exemplary preview detail window including a preview window in which the scanned page is displayed.

When an image thumbnail is selected in FIG. 3 or 4, a preview detail window 60 shown in FIG. 5 is brought up. The preview detail window 60 includes a back button 61 which returns the user to the thumbnail selection window 34 shown in FIGS. 3 and 4. The image preview detail window 60 includes a preview window 51 which shows a preview of the scan document. Also included in the image preview detail window 60 are up and down pan buttons 42 and right and left pan buttons 43. These pan buttons allow the user to pan through the previewed image. On the left side of the image preview detail window 60 above the pan buttons is a page information window 41 which includes information about the selected previewed page or image. In the example shown in FIG. 5, the page information window 41 includes an identifying number of the thumbnail, an image size and a color mode of the thumbnail image. Other information may also be displayed in the page information window 41, such as, process history, page resolution, page identification, bar code information from the page, watermarks, or other types of information.

In addition, several buttons are included in right side of the preview image detail window 60. The first button included is a left arrow or previous button 44. The previous button 44 enables the user to see the page that was scanned directly before the currently displayed page. A right arrow or next button 45 is also included which allows the user to view the page that was scanned directly after the currently displayed page. Also included are a rotate forward button 46 that allows the user to rotate the image 90 degrees clockwise and a rotate back button 47 that allows the user to rotate image 90 degrees counterclockwise. A zoom-in button 48 that allows the user to zoom in on the image in preview window 51 is included directly above the rotate forward button 46. A zoom-out button 49 that allows the user to zoom-out from the image in the preview window 51 is included next to the zoom-in button 48. Finally, a delete button 50 that allows the user to delete the currently displayed image from of current job is included. The delete function initiated by the deleted button 50 is useful for deleting blank pages or for deleting pages mistakenly scanned in the scan job.

With respect to the rotation forward button 46 and rotate back button 47, these buttons change the orientation of the final scanned page. Once the preview job is submitted, the rotated result will be seen in the final electronic or paper documents. In addition, another feature of the rotation function is a "follow-me" rotational feature. The "follow-me" rotational feature allows a user to rotate an entire image or page while keeping the image or page in view on the display screen. In one embodiment of the present invention the display screen may be a LCD display screen or alternatively the display screen may be any type of display screen that is available to be used with the MFD 1. The size of the display screen is only limited by the physical characteristics of the MFD 1 and can be placed in any feasible location on the MFD 1. Although not illustrated in FIG. 5, the preview image detail window 60 may also include horizontal and vertical flipping functions which enable the user to flip the currently displayed image.

The zoom-in 48 and zoom-out 49 buttons make the previewed image larger or smaller on the window. The zoom-in feature enables the users to enlarge portions of the page. Each previewed image or page can be zoomed based on a percentage that is, preferably in one embodiment, predetermined by the administrator on the server. Alternatively, the user may be able to change the percentage of the zoom locally. In one embodiment, the zoom function does not affect the original document and only allows the user to see more closely the previewed image. Alternatively, the zoom function may be used to permanently change the zoom of the scanned page. When the zoom-in button 48 and zoom-out button 49 are used, the up and down panning scroll bar 42 and the left and right panning scroll bar 43 may be used to pan through a zoomed portion of the image.

Figure 6:
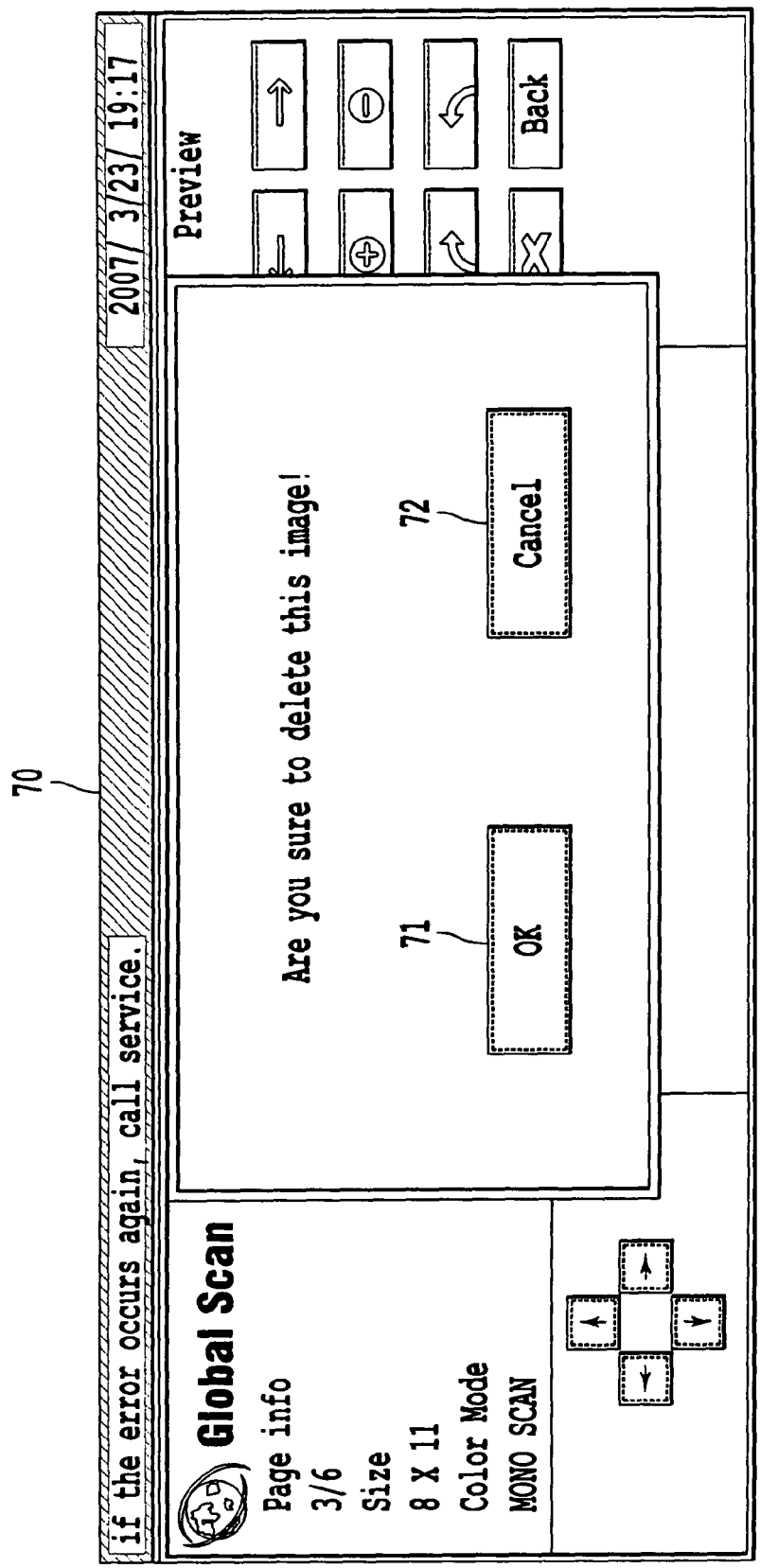
FIG. 6 shows an exemplary deletion confirmation pop-up box that is displayed when the delete button is selected in the preview detail window.

FIG. 6 shows an illustration of a pop-up box 70 that is displayed when the delete button 50, shown in FIG. 5, is selected. If the user does not desire the currently displayed page to be included in the final job set, the current page may be deleted with the delete function initiated by selecting the delete button 50. When the delete function is used, the current page preferably is not generated in the final document. Once the delete button 50 is selected, the pop-up window shown in FIG. 6 is displayed. The user may select either the ok button 71 to agree with the deletion or the cancel button 72 which returns the user back to the preview window. If the user presses the ok button 71 the current page is deleted and the preview window displays the next page of the scan. If the deleted page is the last page in the total scan, the next image shown in the preview window is the previous image in the scan.

After deleting an image or selecting the back button 61, the user is returned to the thumbnail selection window 34 shown in FIGS. 3 and 4. When the user has finished previewing the pages the user may select one of a restore button 31, a cancel button 32 or a submit button which are shown in the top right corner of the window shown in FIGS. 3 and 4.

Figure 7:
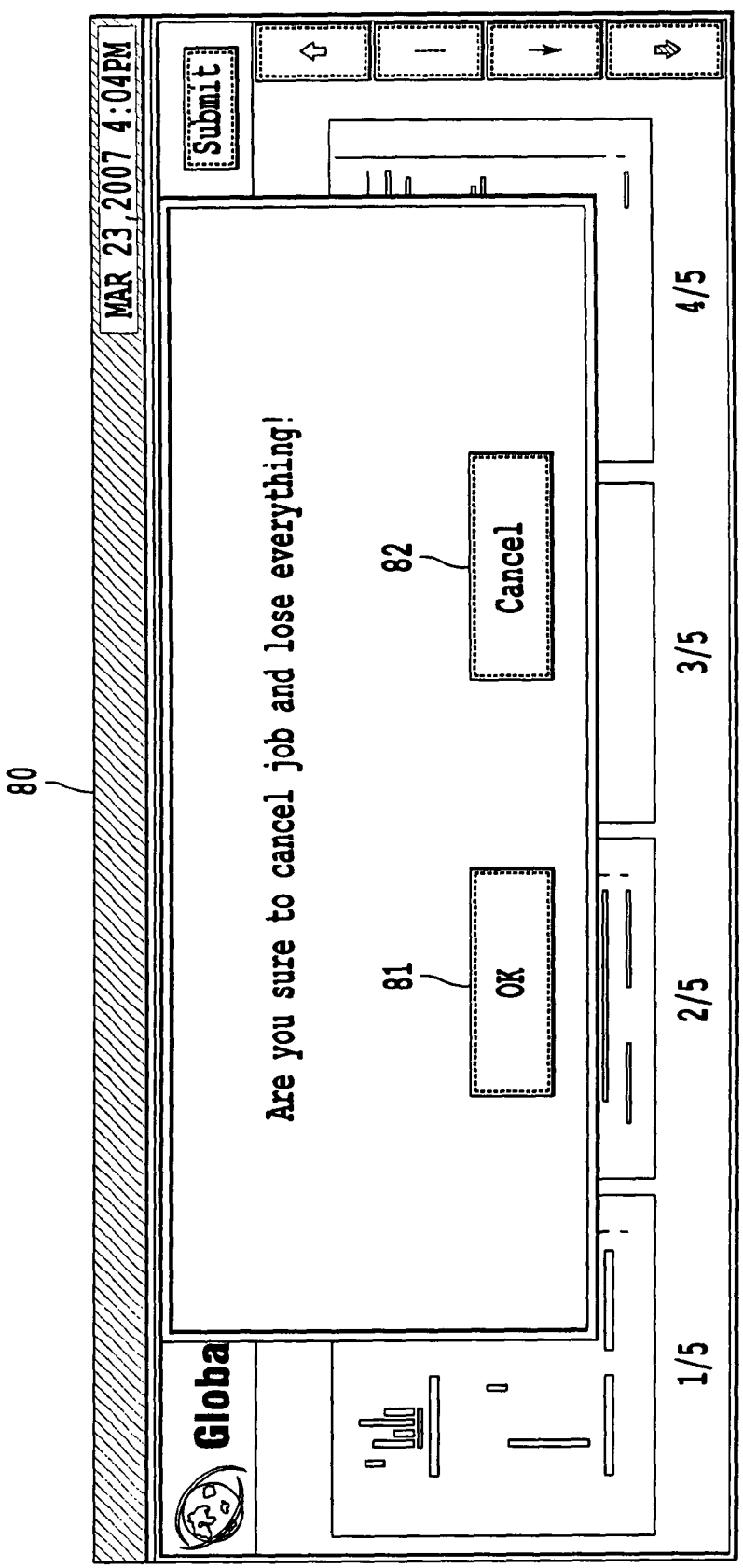
FIG. 7 shows an exemplary cancellation confirmation pop-up box that is displayed when the cancel button is selected in the single preview detail window or thumbnail selection window.
Figure 8:
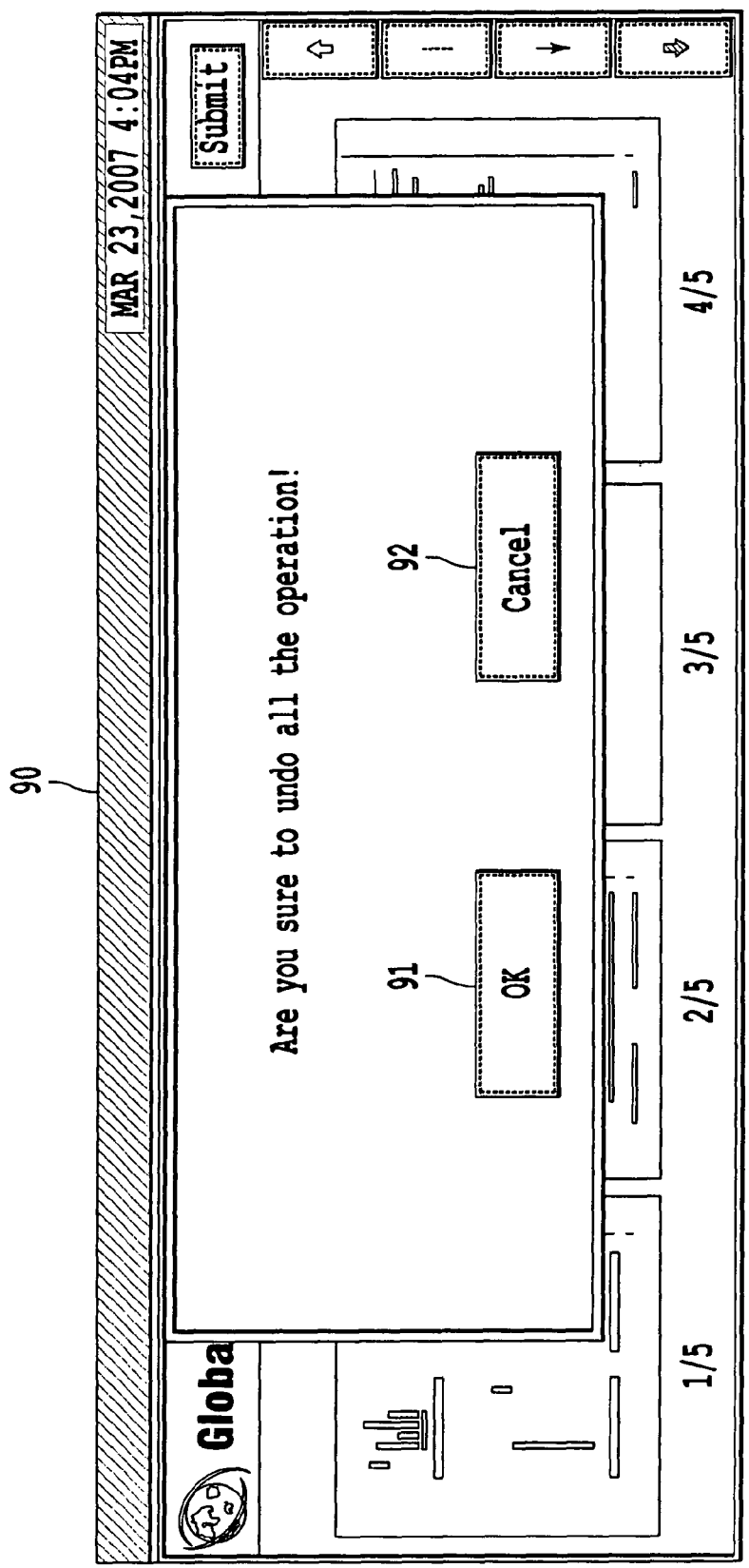
FIG. 8 shows an exemplary undo confirmation pop-up box that is displayed when the undo button is selected in the single preview detail window or thumbnail selection window.

When the cancel button 32 shown in FIGS. 3 and 4 is pressed, a cancel job pop-up box 80 shown in FIG. 7 is displayed. The cancel job pop-up box 80 includes an ok button 81 and a cancel 82 button. When the user selects the ok button 81, the preview operation, as well as the scan job, is cancelled and no document is generated at the job's destination. In contrast, if the user selects the restore button 31, a pop-up box 90 shown in FIG. 8 will be displayed. The pop-up box 90 also has an ok button 91 and a cancel button 92. If the ok button of the undo pop-up box 90 is selected, then the preview operation is canceled and the user is sent back to the beginning to do the preview operation again. When the preview operation is canceled, all rotations, deletions and other such changes are removed from the record and the scan job image set will be returned to its first scanned state. Finally, the submit button 33 shown in FIGS. 3 and 4 is used to submit the preview changes to the GlobalScan server 5 or to a predetermined output portion of the MFD 1.

FIGS. 9-12 illustrate a number of settings that may be defined on the server side before the user uses the preview function on the MFD 1. Specifically, an administrator is able to change some aspects of the image thumbnail preview user interface discussed above. The administrator is able to change the settings on the GlobalScan server 5 in several different ways including locally and remotely via software or via a web-browser. In the present example illustrated in FIGS. 9-12, a web-browser is used to access the GlobalScan server 5 via an http protocol.

Figure 9A:
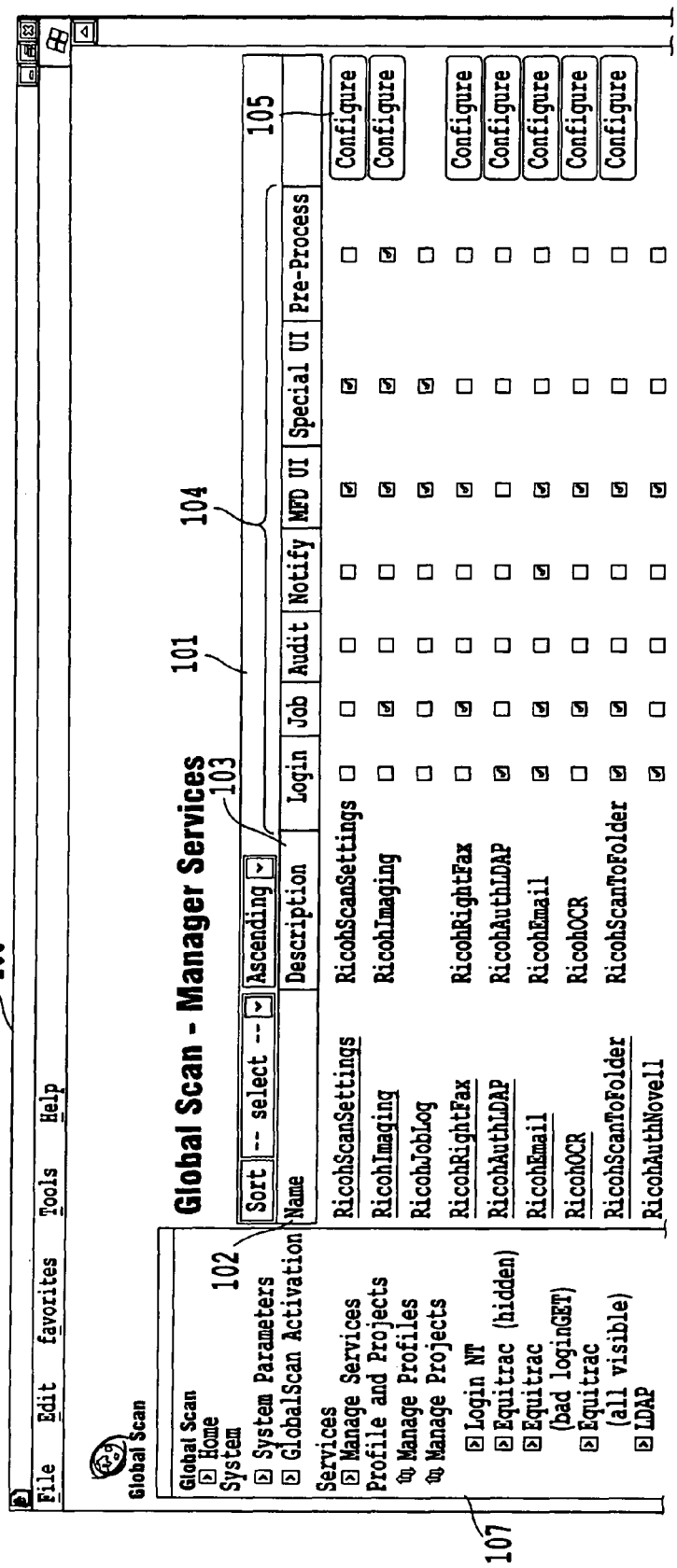
FIGS. 9A & 9B illustrate a manage services window used to remotely manage services on a GlobalScan server.
Figure 9B:
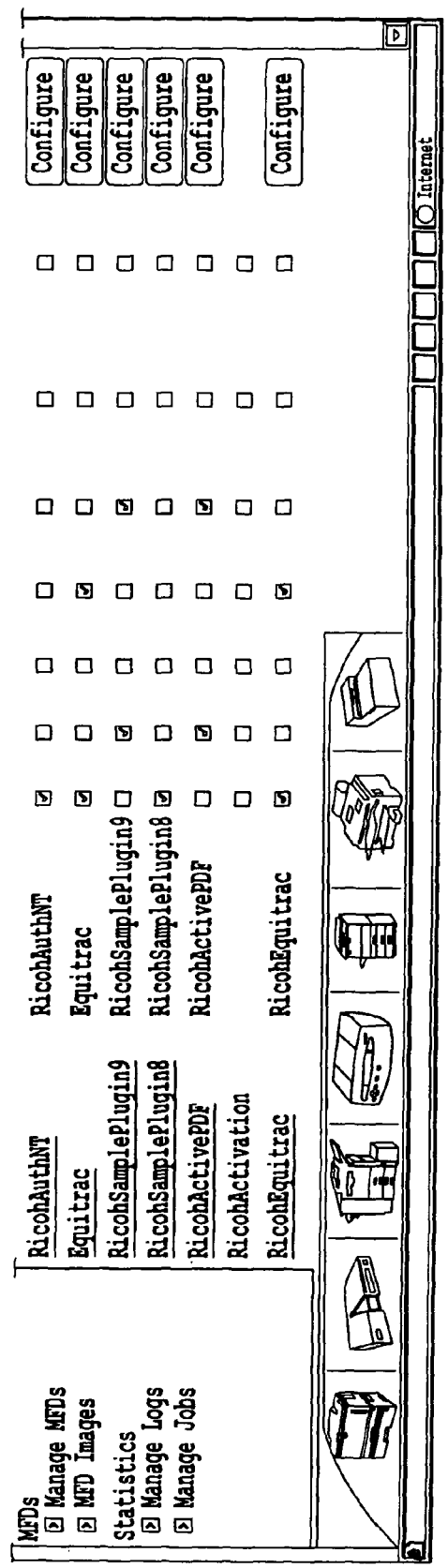

In FIGS. 9A&B, a manage services window 100 is selected by selecting a manage services button from a GlobalScan menu 107. The manage profile window 100 includes information about a number of services. Specifically, each service includes a service name 102, a service description 103 and number of informational check boxes 104 and a configure button 105. The order of the display of the services in the manage services window 100 can be changed using the sort bar 101. In the sort bar 101 is included a sort button a "sort by" drop-down box and a "sort direction" drop-down box. The "sort by" box enables the user to select which category (i.e. name 103, description 103 or one of the information check-boxes 104 such as "Job") is used to sort the list of services. The "sort direction" drop-down box lets the user select an ascending or descending order of the sort.

Figure 10A:
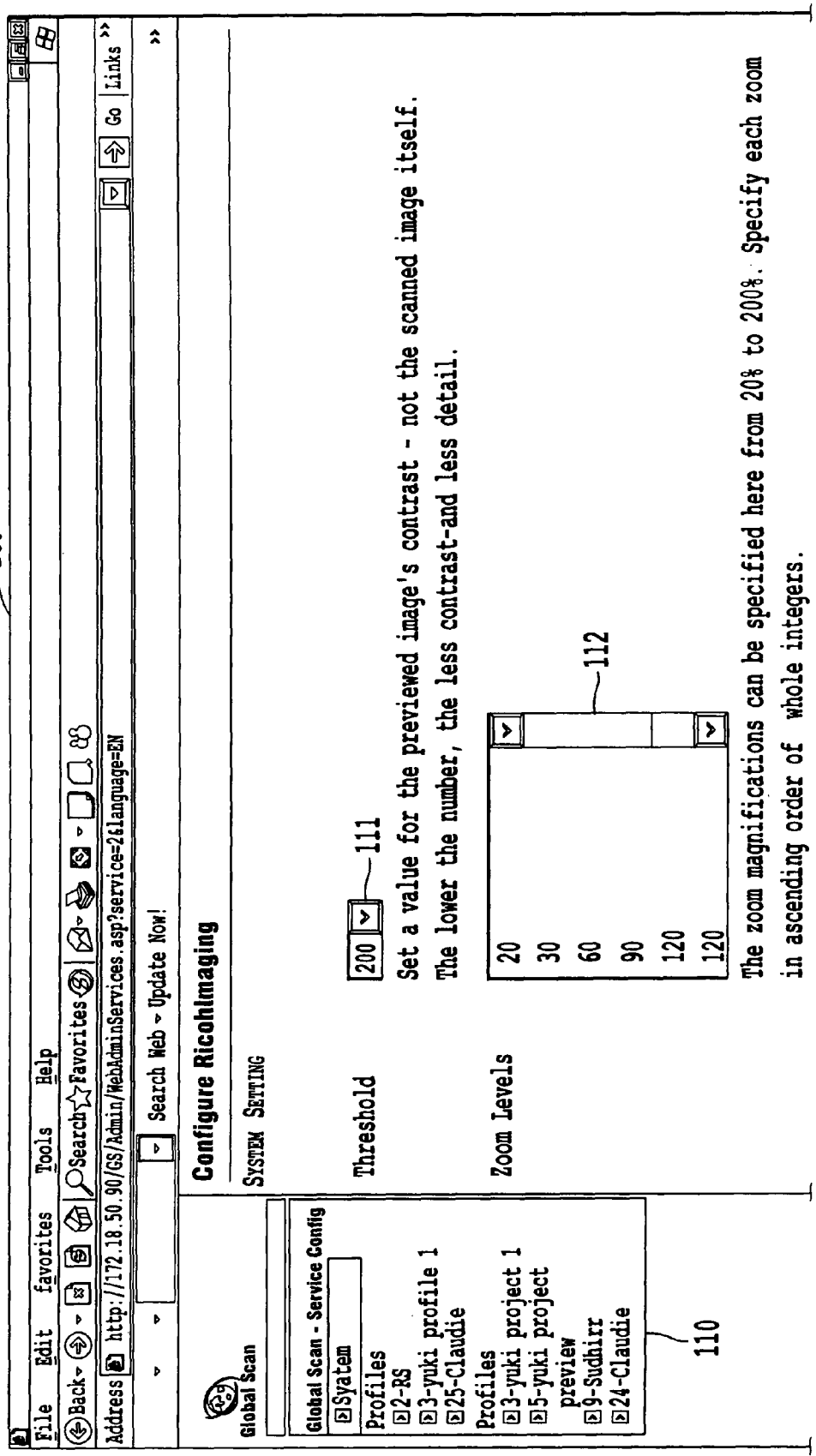
FIGS. 10A & 10B illustrate a server configuration settings window for the image preview function used to remotely change image preview function settings on the GlobalScan server.
Figure 10B:
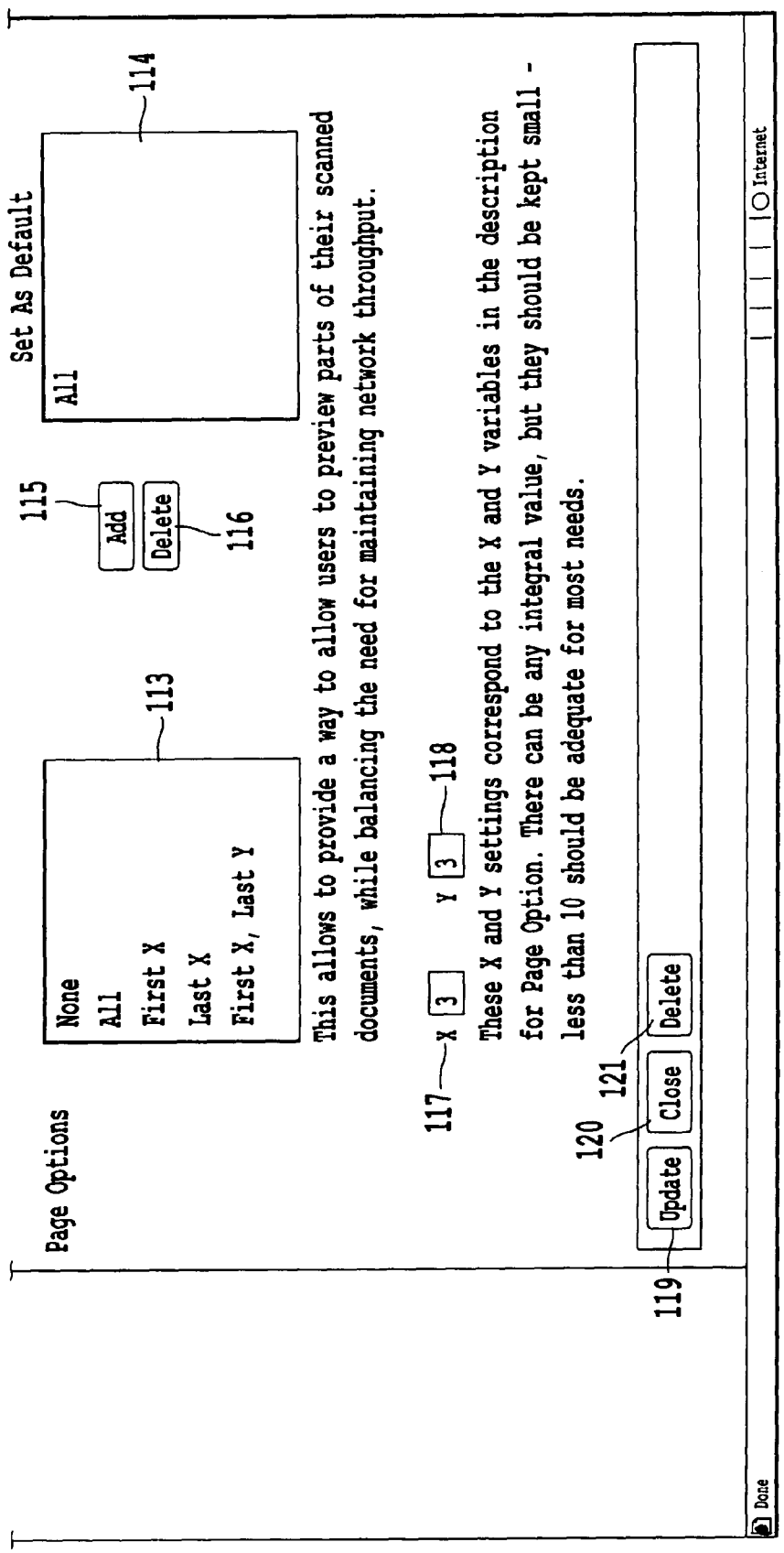

When the user selects the configure button 105, a service (plug-in) configuration window 160, shown in FIGS. 10A&B, is displayed. Included in the service configuration window 160 are several settings related to the selected service. In the example shown in FIGS. 10A&B, the image preview service (plug-in) includes a threshold setting 111, a zoom level setting 112, and a page options setting 113-118. Also, included are an update button 119, a close button 120 and a delete button 121.

The threshold setting 111 includes a drop-down box which enables the administrator to set a value for the previewed image's contrast. The lower the number selected by the administrator, the less contrast and as a result less detail shown on the preview image. It should be noted that this setting does not affect the contrast of the scanned image.

The zoom levels setting 112 includes a number of zoom percentages that are able to be selected for use by the administrator. In the zoom levels selection box includes zoom magnifications that range from 20% to 200%. The zoom levels are listed in the box in ascending order and in whole integers. The zoom level 164 corresponds to how much zoom is applied when the zoom-in 48 or zoom-out 49 buttons are selected in FIG. 5.

Figure 2B:
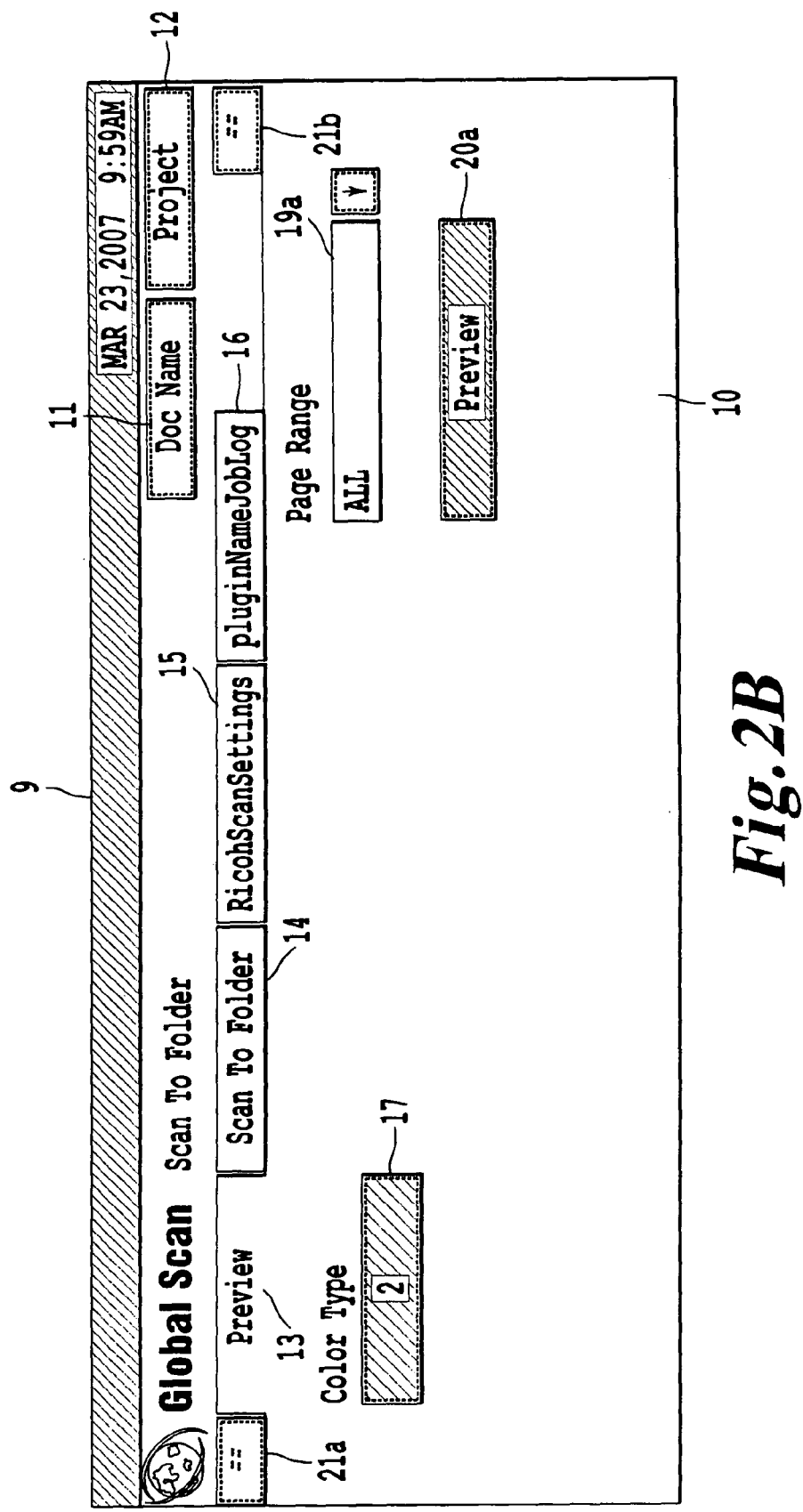
FIG. 2B shows an exemplary MFD main window in addition to an exemplary preview page including a highlighted preview button.
Figure 2C:
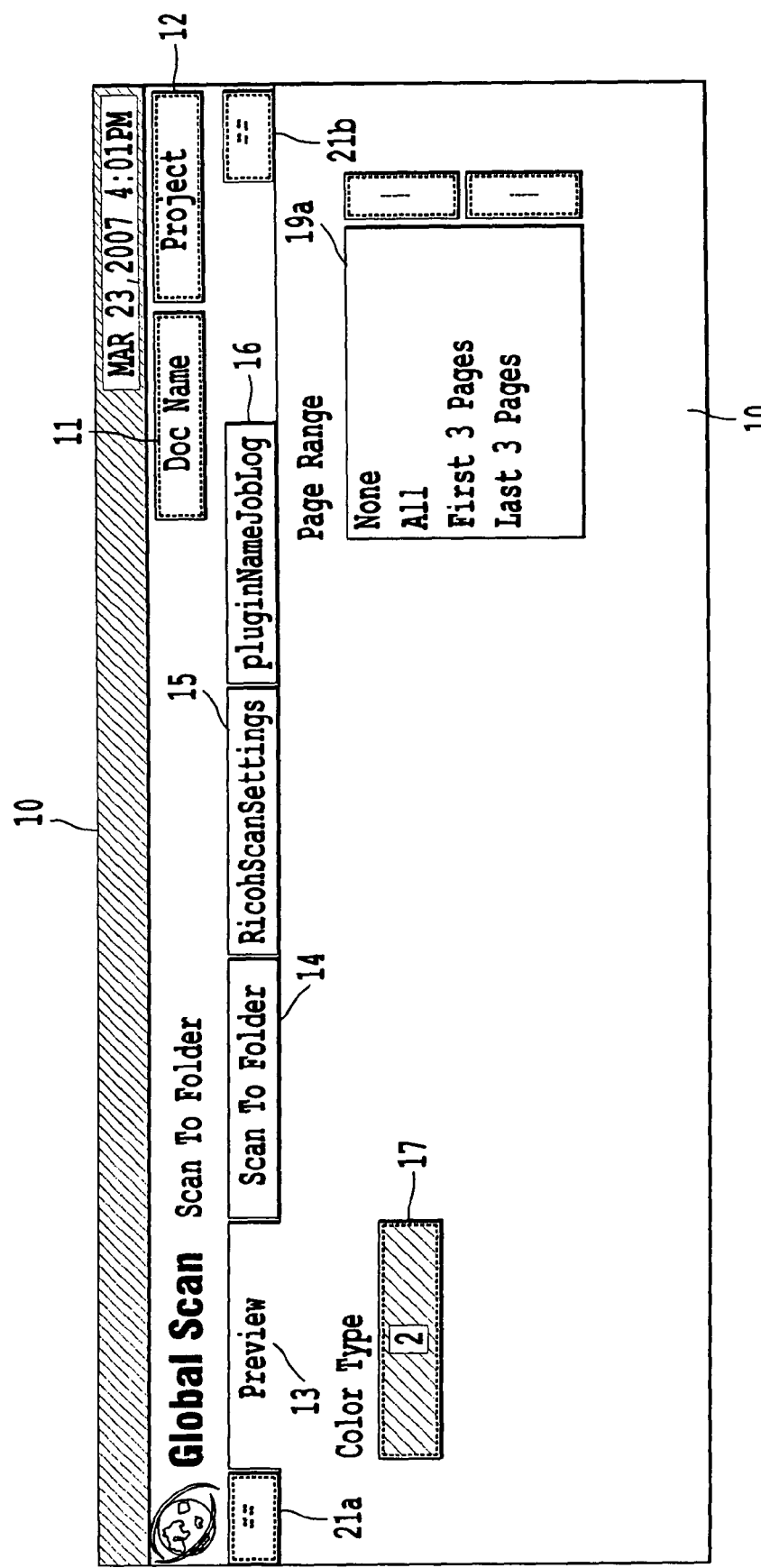
FIG. 2C shows an exemplary MFD main window in addition to an exemplary preview page including an expanded Preview Page Range drop-down box.

The page options setting 113-118 enables the administrator to select which options will be available in the preview page range dropdown box 19a shown in FIGS. 2A-C. In page option selection box 113, the administrator is able to select which options will be available in the preview page range dropdown box 19a. In the present example, the options available for selection are "none", "all", "First X", "Last X" and "First X, Last Y". The values for the "X" and "Y" variables are editable in option boxes 117 and 118. Theses X 117 and Y 118 settings correspond to the X and Y variables in the page option selection box 113. The values may be any integral value and are preferably kept small as a number less than 10 should be adequate. Also included in the Page option setting are the default page selection option 114. Using the add 115 and delete 116 buttons the administrator can add and delete the default selection shown in box 114.

When the update button 119 is selected, the changes made in the service configuration window 160 are stored in a configuration file that is used to update the available options of the MFD 1. When the close button 120 is selected the administrator is returned to the manage services window 100 shown in FIGS. 9A&B. When the delete button 121 is selected the settings are cleared.

It should also be noted that when the configure button 105 is selected for the RicohScanSettings service (Image preview function) the service configuration window 160 displayed corresponds to the default system service configuration. Once these settings are saved by selecting the update button 119, each unchanged profile on the GlobalScan server 5 is updated to have settings corresponding to the default system service configuration. However, if the administrator desires to customize the settings of a specific profile or project, this profile or project can be selected from the selection toolbar 110. For example, in the selection toolbar 110 the administrator could select the "2-RS" profile. When this profile is selected the administrator could then adjust the settings in the service configuration window 160 for this profile. This can also be accomplished for the projects included in the selection toolbar 110.

Figure 11A:
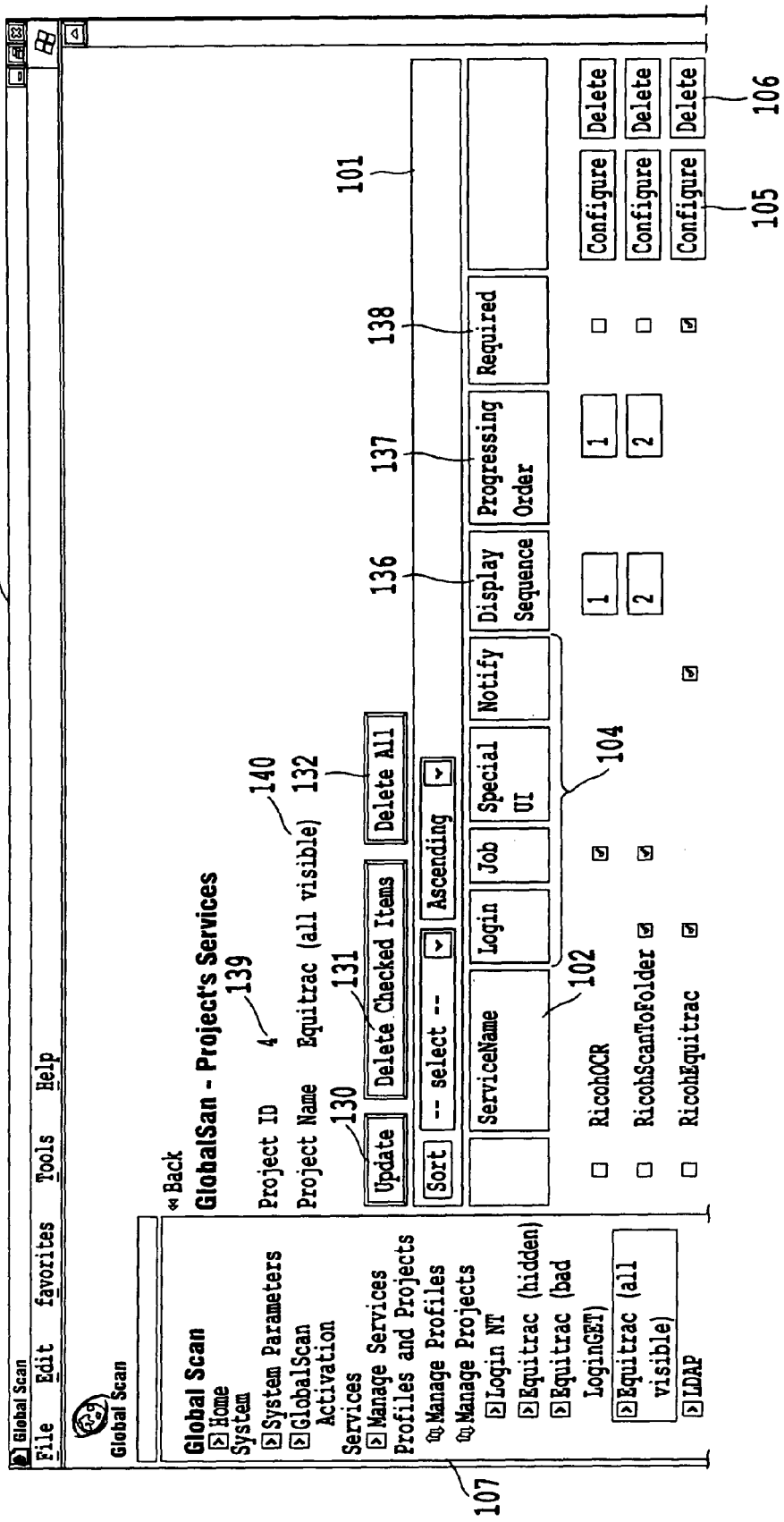
FIGS. 11A & 11B illustrates a profile settings window used to services with profiles on the GlobalScan server.
Figure 11B:
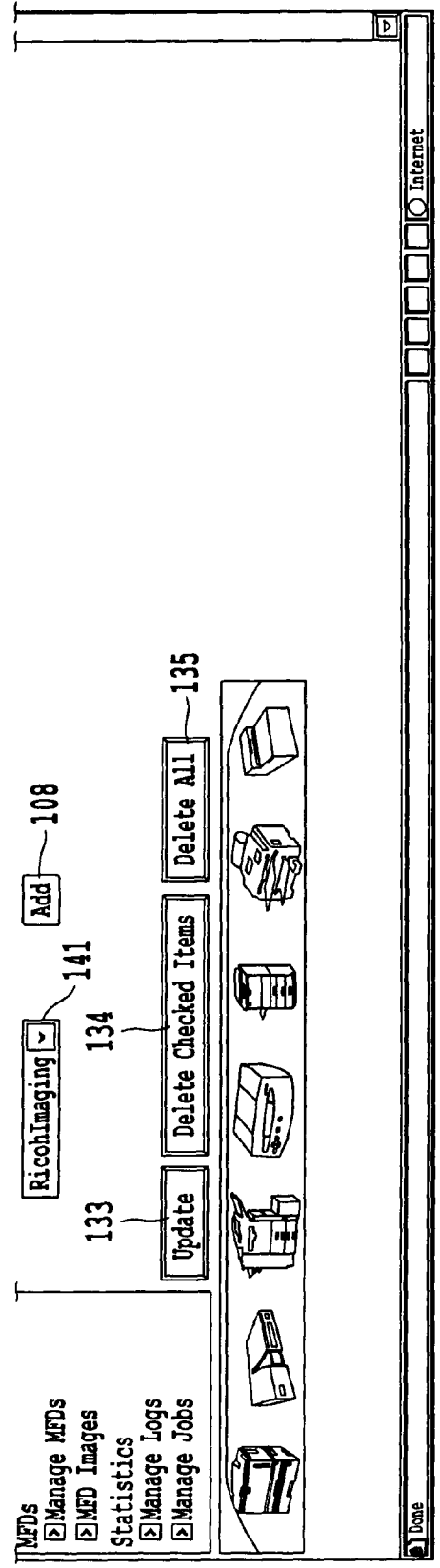

In order to add or remove a profile or project from the selection toolbar 110 the Project/Profile service window shown in FIGS. 11A&B and 12A&B may be used. After selection is made in the GlobalScan menu 107 of a specific project or profile, the Project/Profile service window is displayed. In the Project/Profile service window the project/profile id 139 is displayed along with the project/profile name 140. Also included in the Project/Profile service window are update buttons 130/133, delete checked items buttons 131/134 and delete all buttons 132/135. The update buttons 130/133 save the changes made my the administrator, the delete checked items buttons 131/134 remove the checked services from the listed services and the delete all buttons 132/135 removes all the services from the service list the service list includes all of the services that are available to the profile in question. The service list includes for each included service, a service name 102, a number of service settings 104, a display sequence 136, a processing order 137, a required check-box 138, a configure button 105 and a delete button 106. The delete button 106 deletes the service from the service list. The configure button 105 takes the administrator to the service configuration window 160 shown in FIGS. 10A&B.

Figure 12A:
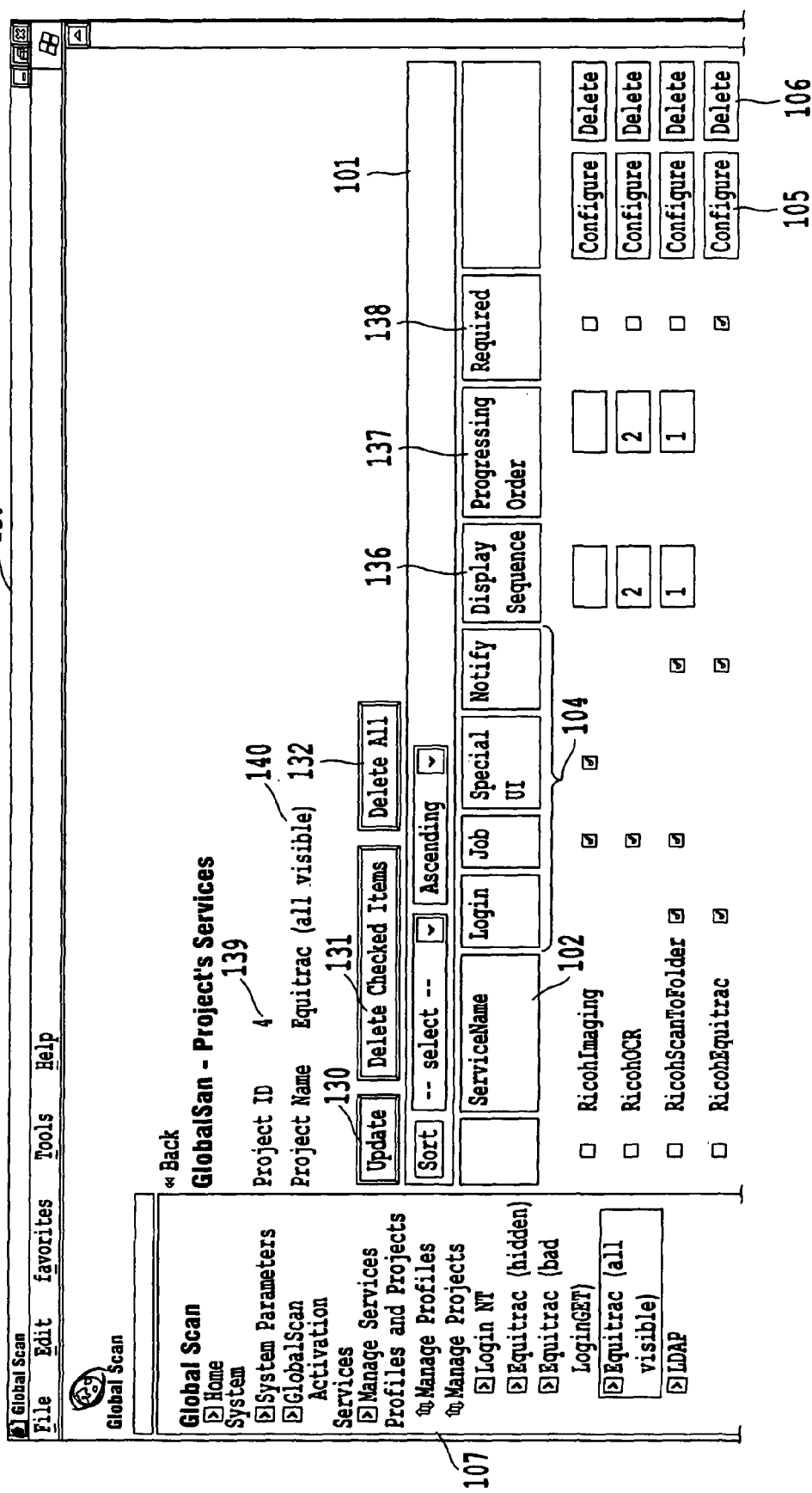
FIGS. 12A & 12B illustrates a profile settings window with a image preview function related service linked with a profile on the GlobalScan server.
Figure 12B:
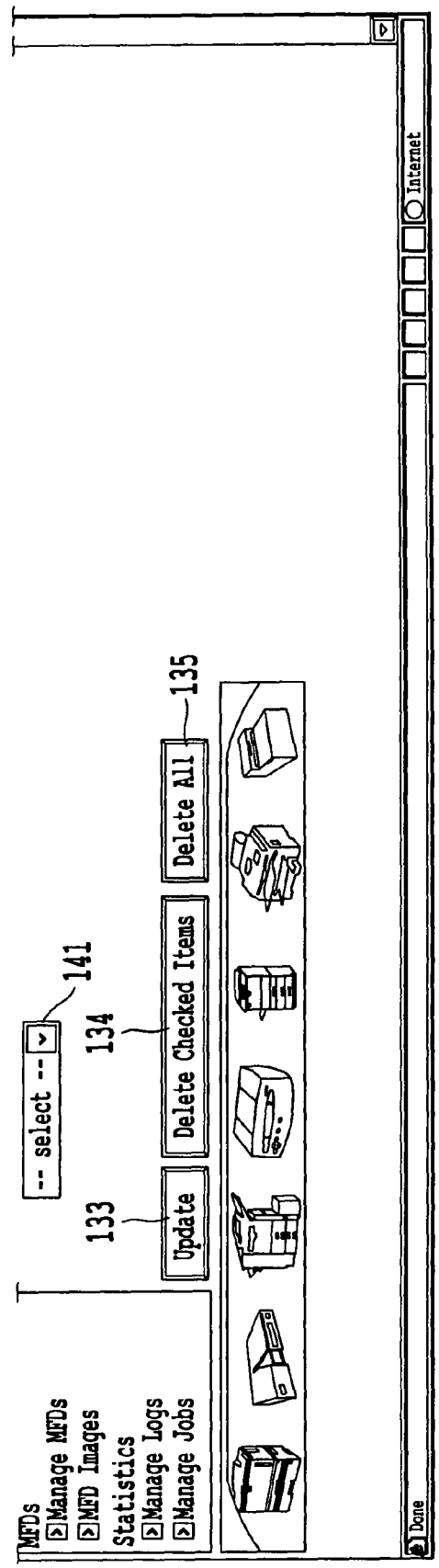

In order to add a service to the service list, the add-service drop-down box 141 lists all available services. When a service is selected the administrator is able to select the add button 107 which adds the service to the service list. Once the service is added to the service list for a project or for a profile, the profile/project shows up on the selection toolbar 110. FIGS. 12A&B shows an example of the Project/Profile service window after the RicohImaging service is added to the service list.

Figure 13:
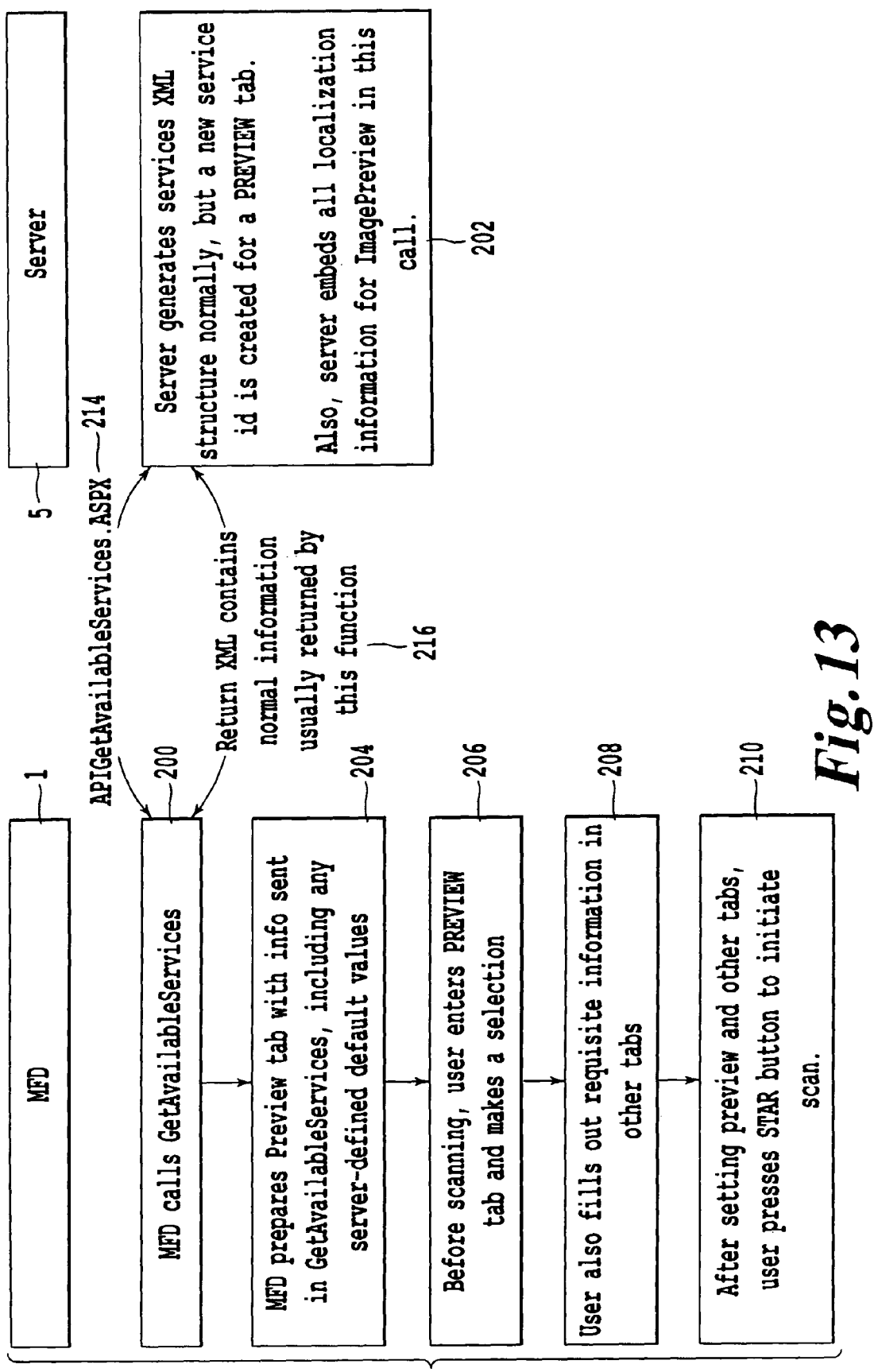
FIG. 13 is a flowchart which illustrates the interaction between a MFD and a server for creating the preview window.

FIG. 13 illustrates the process of how the GlobalScan server 5 controls the functions of the MFD 1. The MFD 1 may have difficulty processing native image files such as JPEG or TIFF files as the MFD 1 may not be configured to easily manage any other type of image file other than bitmap images (BMP), making image modifications difficult. In order to overcome these obstacles, a GlobalScan server 5 may be used to perform the image operations in place of the MFD 1. Although using an external GlobalScan server 5 solves the above noted problems, it also creates additional obstacles. For example, when an external server is used, a user session may need cleaning up when a user unexpectedly leaves due to an unexpected disconnection. Additionally, network bandwidth increases with each image preview operation and the images in the native image format JPEG or TIFF need to be converted into Bitmap images and back again.

To overcome these issues, the GlobalScan server 5 employs several techniques which include adding to the MFD 1 a cancel job feature and that may be the default server action if session timeout occurs. In addition, the server 5 can perform down-sampling of bitmap files as, for example, a 400 dpi full color JPEG can generate a 90 megabyte bitmap file and performing previews and rotations on such a large file is not efficient and adds overhead to the network. In addition, the GlobalScan server 5 is able to down-sample high quality images to a quality that makes best use of the LCD panel found on the MFD. This eliminates the possibility that the user may notice the change in quality. In addition, the server tracks a history of operations on pages or image files such as, for example, rotations or deletions, and performs these operations on the down-sampled images during the preview session. The server may then perform all operations at once at the end of the preview session on the original images. This allows for multiple rotations to be combined into one operation or deletions to delete the image all together.

FIG. 13 illustrates the flow for setting up the preview page 10 and preview tab 13 illustrated in FIGS. 2A-C. The flow begins in 200 when the MFD 1 calls a GetAvailableServices function. The GetAvailableServices function is called through a APIGetAvailableServices.aspx active server page 214. When the MFD 1 uses this aspx file to make a request to the server 5, the GlobalScan server 5 generates a typical services xml structure but also includes a new service ID that is created for the preview tab 13. Additionally, the server 5 embeds all localization information for the image preview in this call. The server 5 then returns an xml file containing the normal available services information as well as the data for the preview tab 13 in 216. In step 204, the MFD 1 prepares the preview tab 13 from the information obtained by the GetAvailableServices function including any server defined default values. In step 206, before scanning, the user selects the preview tab 13 and highlights the Preview button 20a. In step 208, the user fills out the requisite information in other tabs (14-16). Finally, in step 210, after placing the preview button 20a in a highlighted state and completing the additional settings in the other tabs, the user presses start to initiate a scan.

FIGS. 14A-C illustrate an xml information retrieved by the GetAvailableServices function run on the GlobalScan server 5 and initiated by the MFD 1. In line 1, a screen_data tag opens the file. Lines 2-23 include the settings for an option drop-down box shown as the Preview Page Range box 19a in FIGS. 2A-C. Each item included in the drop-down box is listed, including: none, all, first five, first three, last three. Line 24 of FIG. 14A through line 11 of FIG. 14C include the localization options which are comprised of a variety of different settings. Specifically, in one embodiment lines 25-31 of FIG. 14A include a thumbnail width and a thumbnail height display values. In another embodiment the thumbnail width and thumbnail height values may be predetermined and stored in the MFD 1. In line 32, a page select tag lists the page range. In lines 33-35, a title of the thumbnail selection page is listed. In lines 4-12 of FIG. 14B, the restore, cancel and submit buttons titles are included. Lines 13-21 correspond to the data in the page information window 41 shown in FIG. 5. In addition, in lines 22-24 of FIG. 14B, the back button, shown in the single image preview window 40 when only one page is scanned in the job, is included. Also included in lines 25 through line 10 of FIG. 14C are the previous, next, rotate forward, rotate back, zoom-in, zoom-out and delete button titles that are illustrated in FIG. 5.

Figure 15A:
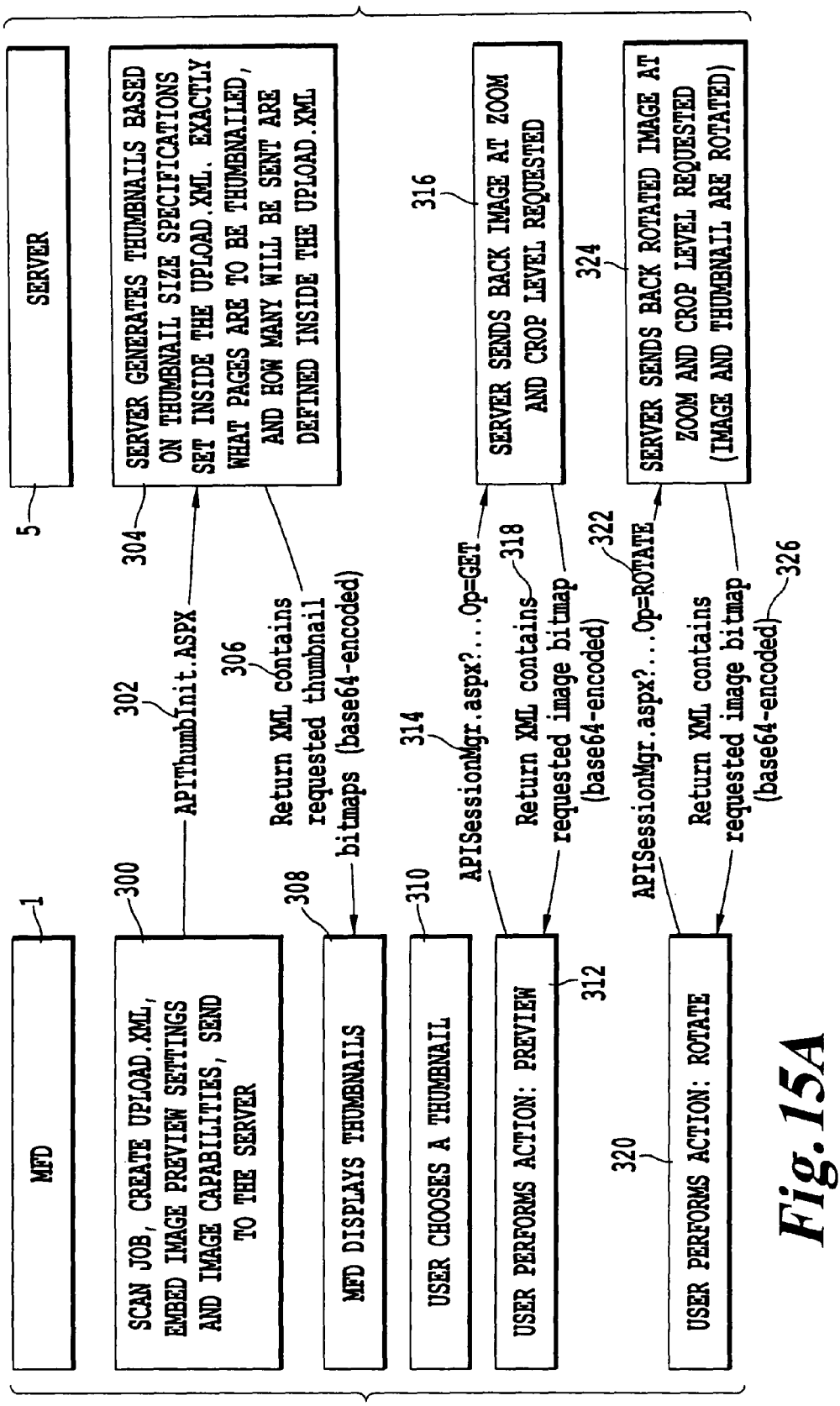
FIGS. 15A and 15B are a flowchart which illustrates the interaction between a MFD and a server for performing a number of preview operations on the scanned job.
Figure 15B:
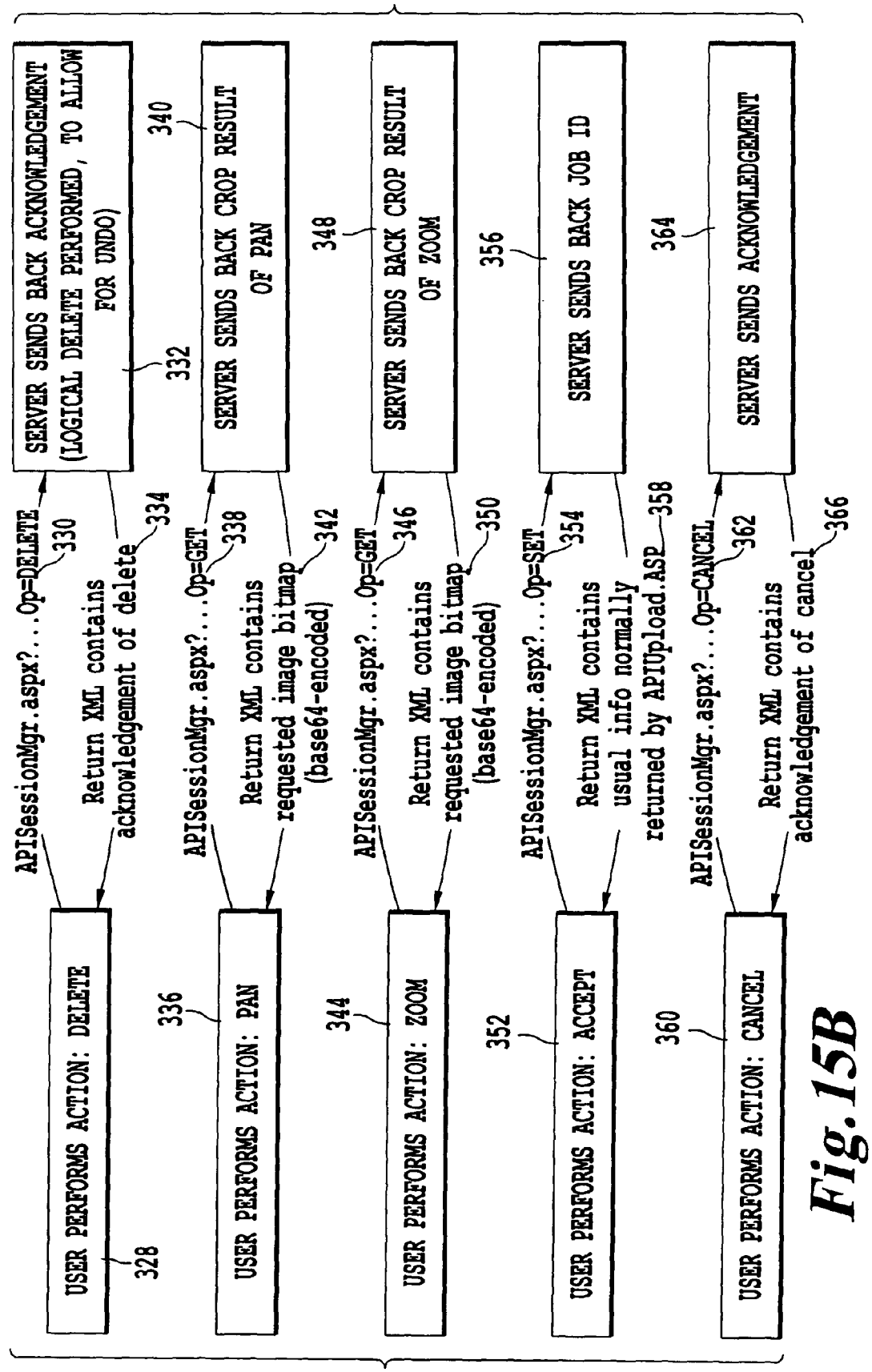

FIGS. 15A and 15B illustrate the process between the MFD 1 and the GlobalScan server 5 once the scan job, with image preview button 21a selected, is completed. In step 300, the scan job is finished and an upload.xml is created which sends the scan job including all scanned pages or images and embeds the image preview settings and image capabilities and sends this information to the server 5 using an APIThumbInit.aspx page in step 302. In step 304, the GlobalScan server 5 generates thumbnails based on the thumbnail size specification set inside the upload.xml. Exactly what pages are to be thumbnailed and how many will be sent are defined inside the upload.xml file. In one embodiment of the invention, the server 5 is able to automatically detect blank pages and will not include these blank pages in the return xml. Alternatively, the server 5 may not automatically remove blank pages from the scan job. In addition, in one embodiment of the invention when the GlobalScan server 5 receives the scan job, the scan job is stored in a temporary location on the server 5. Alternatively, in another embodiment the scan job is stored in a more permanent storage location on the server 5, such as on a memory card or on a hard drive.

The GlobalScan server 5 then returns an xml file containing the requested thumbnail bitmaps in step 306. In step 308, the MFD 1 displays the thumbnails. In step 310, the user chooses a thumbnail and in step 312 the preview function is automatically performed since the user has selected a thumbnail in step 310. As soon as the preview function is selected, an APISessionMgr.aspx?action=preview&action_input=op=get 314 call is sent to the GlobalScan server 5. In step 316, the server 5 creates and sends back an image at the zoom and crop level requested. This data is returned via xml in step 318.

When the user performs a rotation action in step 320, the APISessionMgr.aspx function is called again but this time with the settings ?action=preview&action_input=op=rotate in step 322. When the GlobalScan server 5 receives the function call in step 324, the server 5 sends back a rotated image at the zoom and crop level requested via xml in step 326.

When the user performs the delete action in step 328, the APISessionMgr.aspx is called with the settings op=delete in step 330. When the GlobalScan server 5 receives this command, the server 5 sends back, in step 332, an acknowledgement with the delete logically performed to allow for undo. This acknowledgement is returned via xml in step 334.

When the user performs the pan function in step 336, the APISessionMgr.aspx with settings op=pan is called in step 338. When the global scan server 5 receives this command in step 340, the server 5 sends back a crop result of the pan via the xml in step 342.

When user performs the zoom function in step 344, the APISessionMgr.aspx with settings op=zoom is called in 346. The server 5 then sends back the crop result of the zoom in 348, via xml in 350.

When the user performs the action accept in step 352, the APISessionMgr.aspx with settings op=accept is called in step 354. The server 5 then sends back a response of a job ID in 356 via xml in 358.

Finally, when the user performs the cancel action in step 360, the APISessionMgr.aspx with settings op=cancel is called in 362. In step 364, the server 5 sends an acknowledgement of the cancel via xml in 366.

Figure 16:
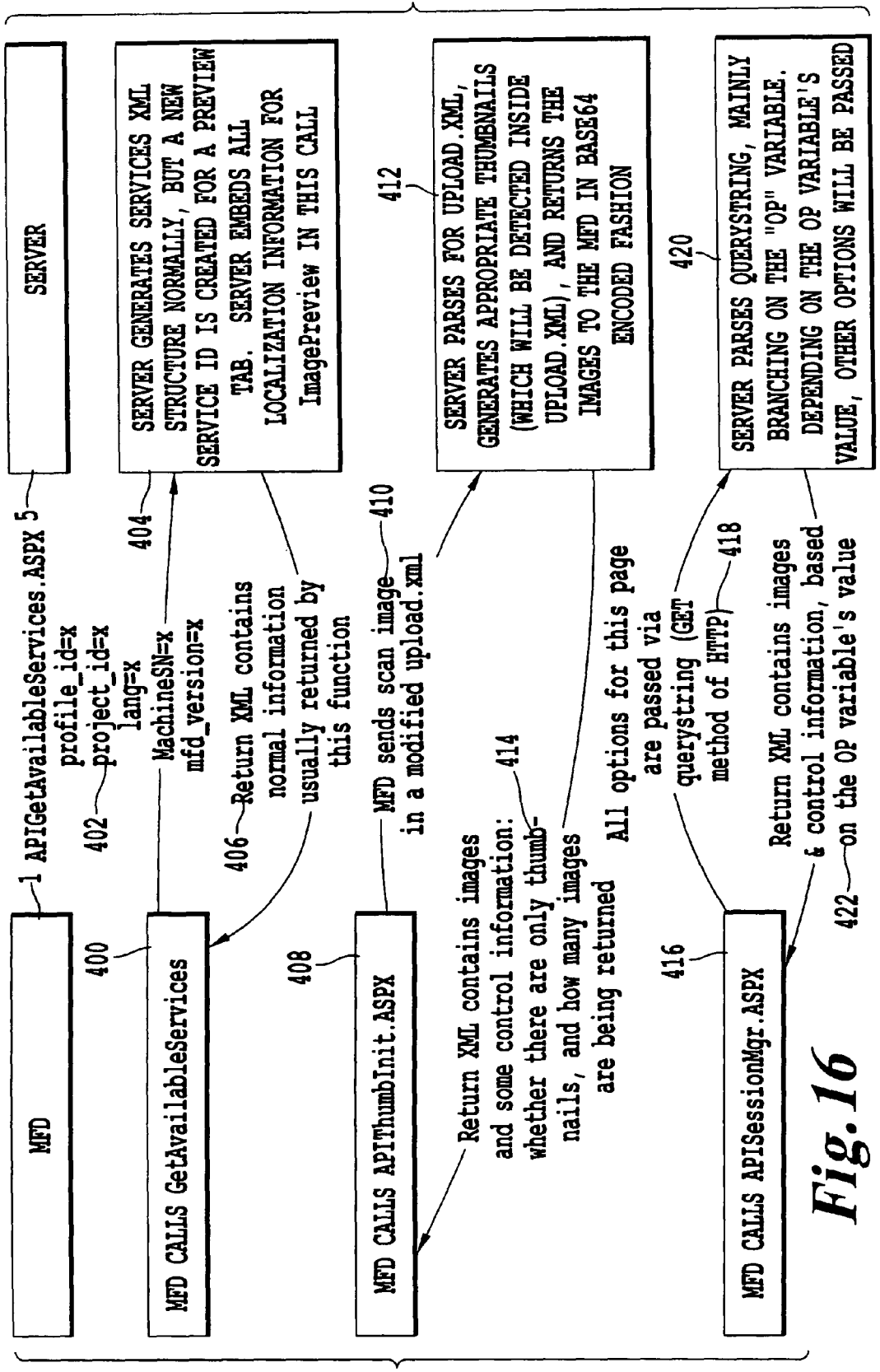
FIG. 16 is a flowchart that illustrates the different types of function calls submitted by the MFD to the server.

FIGS. 13-15 describe the GetAvailableServices function, the ApiThumbInit function and the APISessionMgr function all of which operate via interactions between the MFD 1 and the server 5. FIG. 16 continues this description. Thus, in step 400 of FIG. 16, the MFD 1 calls the GetAvailableServices function using an APIGetAvailableServices.aspx page in step 402. The aspx page called in step 402 also may include additional command line settings such as profile ID, project ID, language, machine serial number or manufacturing version. This data is sent to the GlobalScan server 5, where the server 5 generates a services.xml file that is of the normal structure as it includes data regarding services to be available on the MFD 1. However, the generated service.xml file also includes a new service ID that is created for the preview tab 13. This is accomplished in step 404 where, in addition to the above data, the server 5 embeds all localization information for the image preview in the xml file. The xml file is then returned to the MFD 1 in step 406.

In step 408, the MFD 1 calls the ApiThumbInit.aspx function. Using this active server page, the MFD 1 sends a scanned image in a modified upload.xml file in 410. The server 5 then, in step 412, parses the upload.xml file and generates appropriate thumbnails from the image data found inside the upload.xml file. The server 5 then returns the images to the MFD 1 in an encoded fashion via xml in 414. The xml file sent to the MFD 1 also contains some control information such as whether or not there are only thumbnails included in the xml file and how many images are being returned.

In step 416, the MFD 1 calls the APISessionMgr.aspx active server page. All options for this page are passed via a query string i.e., the get method of http in step 418. In step 420, the server 5 parses the query string mainly branching on the op variable. Depending on the op variable's value, other options may also be passed. In step 422, the return.xml file, which contains images and control information based on the op variable value, is sent to the MFD 1.

Figure 17:
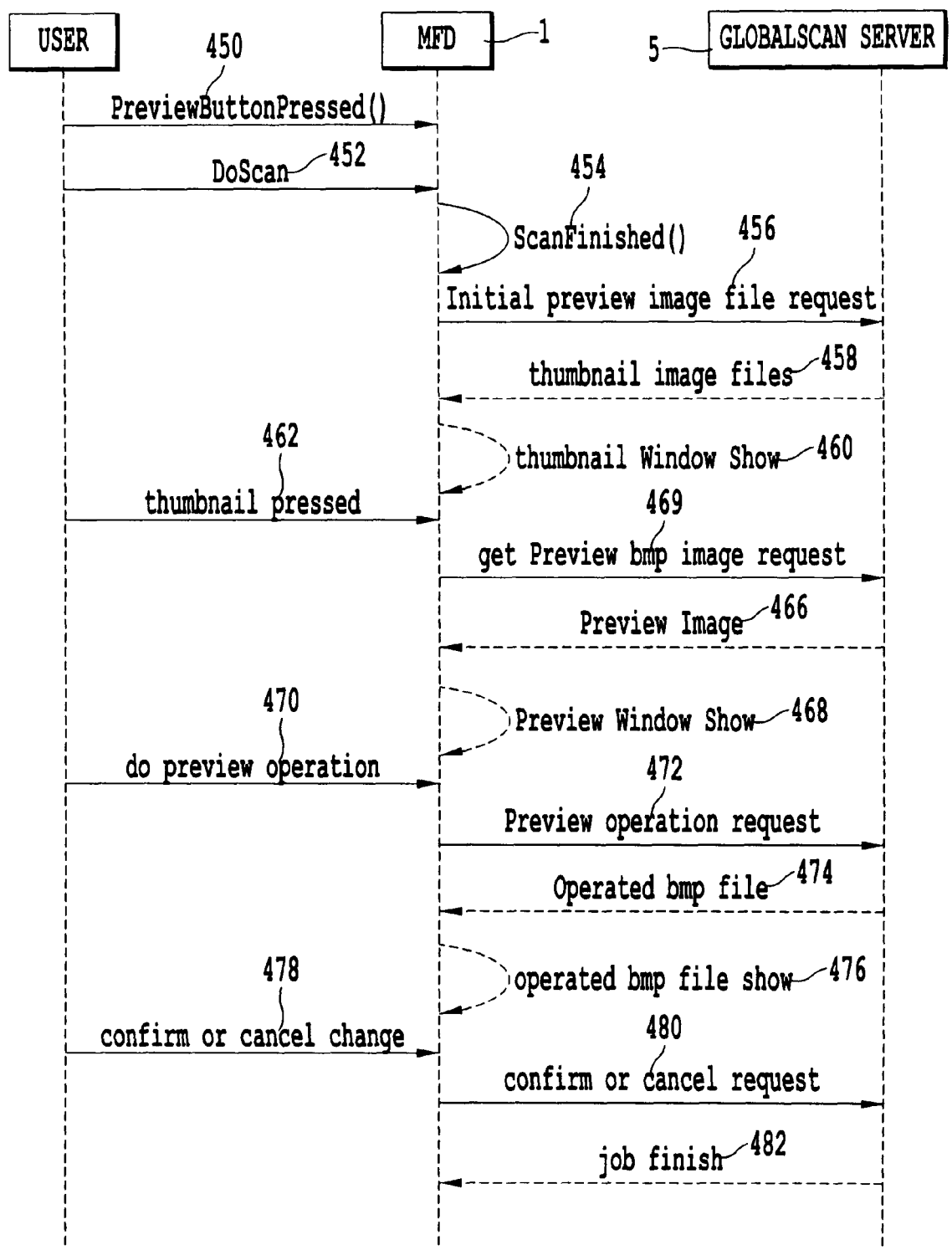
FIG. 17 is a flowchart showing the complete image preview process between the user, MFD and GlobalScan server.

FIG. 17 is an example of the operation and flow of communications of a system in which a user, the MFD 1 and the GlobalScan server 5 interact. Beginning in step 450, the preview button 20a is pressed by the user on the operation panel of the MFD 1 or via some other method such as via a handheld device which connects to the MFD 1 via a wireless connection. As was noted earlier, when the preview button 20a is pressed, the button 20a is selected and highlighted as is shown in FIG. 2B. After the preview button 20a is highlighted, when the user selects the start button in step 452, the MFD 1 begins scanning the input images or pages. Once the scan is finished in step 454, the MFD 1 sends an initial preview image file request to the GlobalScan server 5 in step 456. The GlobalScan server 5 then returns thumbnail image files in step 458 which are shown by the MFD 1 in step 460 to the user. When the user selects a thumbnail in step 462, the MFD 1 sends a get preview bitmap image request in step 464 to the GlobalScan server 5.

The GlobalScan server 5 returns a preview image in step 466 and in step 468, the preview image is shown to the user. In step 470, when the user selects a preview operation, the MFD 1 forwards a preview operation request in step 472 to the GlobalScan server 5. The GlobalScan server 5 returns a bitmap file which has had the selected operation performed on it in 474. In step 476, the bitmap file is shown to the user. This process is repeated until the user is finished performing operations of the preview images. The user, in step 478, then confirms or cancels the change or changes and this confirmation or cancellation request is then sent to the GlobalScan server 5 in step 480. In step 482, the GlobalScan server 5 sends a job finish command to the MFD 1.

Steps 470-476 will now be described in detail in FIGS. 18-24. However, before turning to the modifying functions in FIG. 19-24, an initialization function will first be described with reference to FIGS. 18A and 18B. The initialized function initializes the thumbnail images and establishes session variables that will apply to all image preview functions for the current session. After a scan job is performed for which the image preview is enabled by the user, the initialization operation is performed. This operation notifies the server 5 and transfers the scanned TIFF, JPEG, etc images to the server 5 by embedding them in an upload xml file. After the server 5 processes the request, the MFD 1 receives from the server 5 the initial thumbnail image files which are displayed on the thumbnail list window shown in FIG. 3A. The data is posted to the server 5 via an upload xml file using http post and the data is returned from the server 5 in thumbnail bitmap files used for display on the thumbnail window.

Figure 18A:
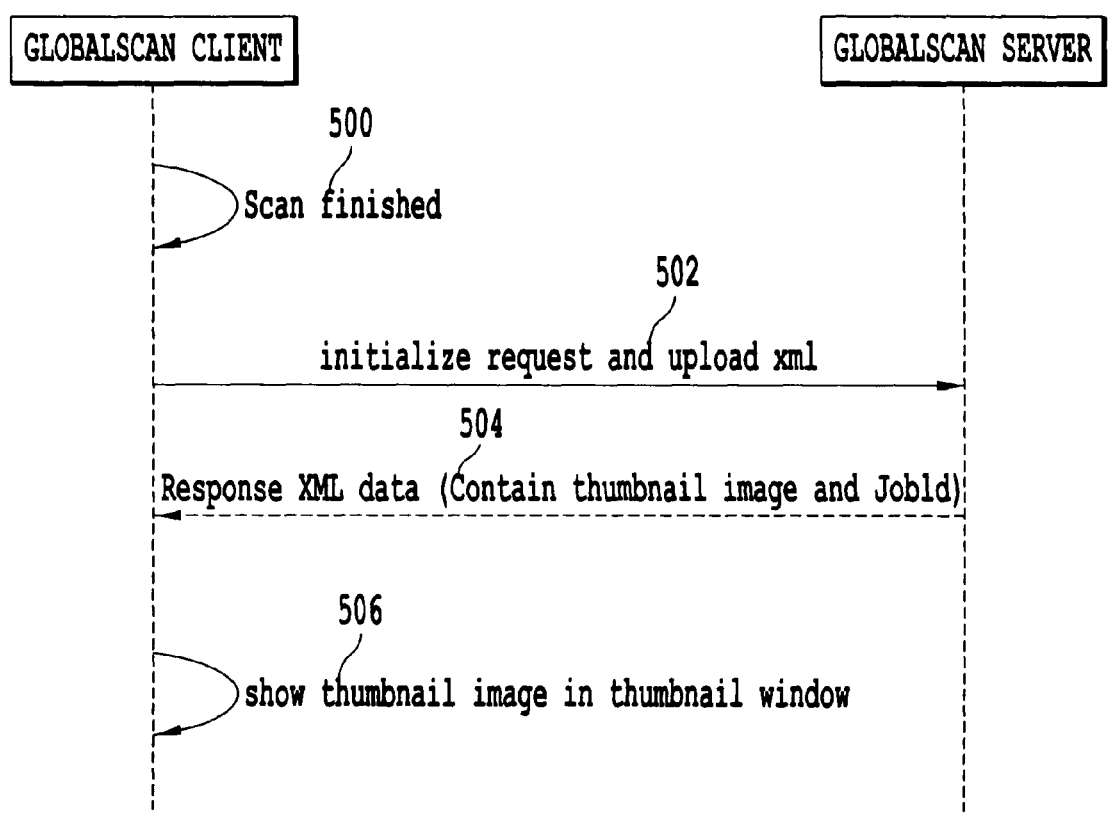
FIG. 18A is a flowchart showing the image preview initialization process between the user, MFD and GlobalScan server.

In FIG. 18A, beginning in step 500 when the MFD 1 finishes a scan, an initialization request is sent in an upload.xml file in 502 to the GlobalScan server 5. The xml request includes the selection the user made on the preview window, a MFD's thumbnail size and a batch size. In step 504, the GlobalScan server 5 responds with xml data containing a thumbnail image and a job ID.

FIG. 18B shows an example of the response xml data returned from the GlobalScan server 5. In line 1, a root tag begins the xml file. An error_code tag in line 2 includes any error codes that might be generated and in line 3, an error_description tag includes a description of any error codes that might have been generated. In line 7, a total page number includes the total number of images or pages scanned in the batch job. In line 8, a page_number tag includes the number of pages selected for the operation. Lines 10-13 and lines 14-17 include examples of thumbnails with ID numbers of 1 and 2 respectively. Also included is a data tag and inside the data tag is a page type tag.

The page type tag is used to store further information about the scanned pages. For example, page type tag includes information that states whether the scanned page or image was originally on A4 landscape or an A4 portrait type paper. The server is able to determine the paper type from the scanned image and retrieves the information necessary to make this determination from a database included on the server. The page type values can be, for example, any of the following: paper auto-detect, paper 8×11 portrait, paper 8×11 landscape, paper 8×17 landscape, paper 8×14 landscape, paper 8×13 landscape, paper 5×8 portrait, paper 5×8 landscape, paper 8×3 landscape, paper 8×4 portrait, paper 8×4 landscape, paper 8×5 portrait, paper 8×5 landscape, paper B4 landscape, paper B5 portrait, paper B5 landscape or any other type of paper.

The information that is included in a bmpdata tag found on lines 11 and 15 is base 64 encoded data which is comprised of image data. The image ID is found in lines 10 and 14 inside the data tag and is used as a unique identifier for the image. It should be noted that, in one embodiment of the invention, the image ID is not required to be numeric value; examples of the image ID are I1, I2 or I3.

Returning to FIG. 18A, in step 506, the thumbnail image is shown in the thumbnail selection window 34. In order to reduce network traffic, the thumbnail images are implemented in batches which are based on the thumbnail size established by the MFD 1 in the initialization request sent in step 502. The APIThumbInit.aspx returns the first page thumbnail images from the server 5. In order to receive the rest of the thumbnail images from the server 5 (as all thumbnails may not fit on the first page) another protocol is used to retrieve the remainder of the thumbnails which uses the APIThumb.aspx?op=getset&batch_number=b command and which retrieves the set using the batch number. The batch number signifies the number of thumbnails to be displayed. For example, if the number of available thumbnails is 50 and the batch size is 10 with a batch number of 3, the function may return 20 to 30 images, depending on how many images are remaining and how many thumbnails were able to be displayed originally.

Figure 19A:
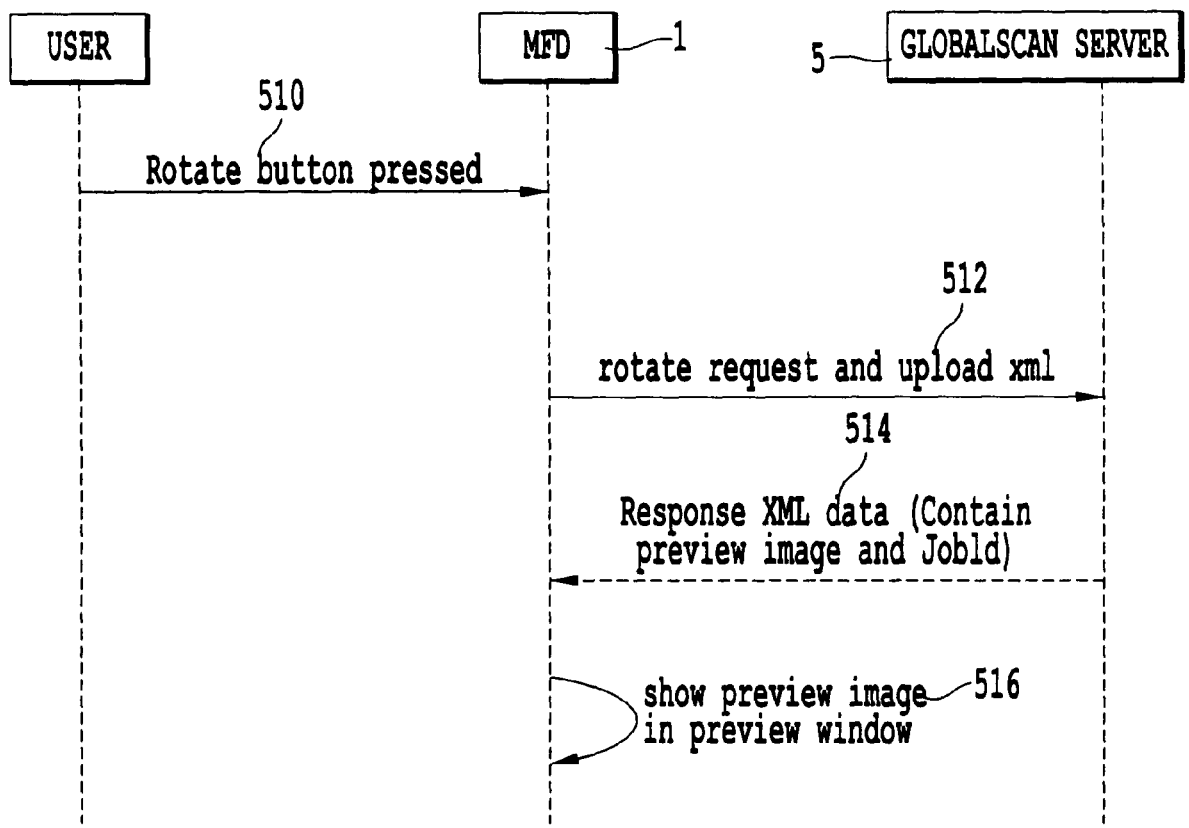
FIG. 19A is a flowchart showing the image preview rotate operation process between the user, MFD and GlobalScan server.

FIGS. 19A and 19B begin the first of the modification type functions. A modification type function is a function which modifies image data. The rotate function is the first modification type function described. After the user presses the rotate button on the preview image detail window 60, the preview image in the preview window 51 either rotates forward 46 or rotates back 47. In order to bring about this action, the rotation request may be sent to the server 5. After the server processes this request, a rotated preview page and thumbnail will be sent from the server 5 to the MFD 1 where it is displayed.

According to one embodiment, the originally scanned TIFF or JPEG file is not be modified at this moment but a recording of the fact that the image was rotated is saved on the server 5. Later, when the user chooses to accept the changes made in the preview, the actual JPEG/TIFF file is rotated, although other implementations are possible. Each time the user presses the rotate button, the image in the preview window 51 is rotated 90 degrees. The rotation algorithm rotates the image from the center of the LCD screen. Accordingly, while after submission the original image is merely rotated, the preview of the rotated image is rotated and zoomed, such that the location of the original pixel at the center of the port still becomes the same pixel at the center of the rotated image. However, different reference points for rotation can be used.

In FIG. 19A, when the user presses the rotate button in step 510, a rotate request 512, made on the MFD 1, is sent to the GlobalScan server 5 in an upload.xml file. Included in the rotate request 512, are several different settings. An image number, degrees of rotation, a request image setting, a zoom setting and a follow me setting, explained below, are all possible settings that can be included in the upload.xml file. The image number setting corresponds to the image identifier generated during the initialization call. For example, if the user wants to rotate image 1, the ID of the image is sent along with the request. The degrees specify the number of degrees to rotate the referenced image. For example, the degrees setting could be 90, 180 or 270 if the user requested rotate forward one, two or three times, respectively. The follow me setting is a flag that determines a reference point for rotation. For example, a follow me value of zero could equal rotate with reference to the center of the original image. A follow me value of 1 could equal rotating with reference to the center of the view port. Finally the zoom setting determines the zoom percentage that the image is zoomed before returning to the MFD 1.

Returning now to FIG. 19B, in step 514 the GlobalScan server 5 returns the xml data response that contains a preview image and job ID. In step 516, the MFD 1 shows preview images modified by the GlobalScan server 5 on the preview window 51 of the MFD 1 for the user to see.

FIG. 19B shows, in lines 1-7, the data format of the rotate request sent from the MFD 1 to the GlobalScan server 5. As noted earlier, the http request includes an APISessinMgr.aspx?action=preview&action_input=op=rotate request as well as several settings which are included in the query string. The possible settings included in the query string are image number, degrees, request image, zoom and follow me. Lines 10-25 show the contents of the xml data returned from the server 5 in step 514. The xml data includes a thumbnail only tag on line 16 which includes a Boolean value which is set to zero in this example. If the setting was set to 1, only a thumbnail would be included in the xml file. Lines 17-19 include the thumbnail of the image and lines 21-25 include the actual preview full sized image which includes width and height values as well as a zoom value. The width and height values are determined to be the most suitable size for the preview image to be shown on the MFD 1 within the view port of the MFD 1. It should also be noted that in one embodiment lines 17 and 23 both include image data encoded in Base64 format. In another embodiment, other encoding formats may be used, including secure formats, if the need were to arise.

Figure 20A:
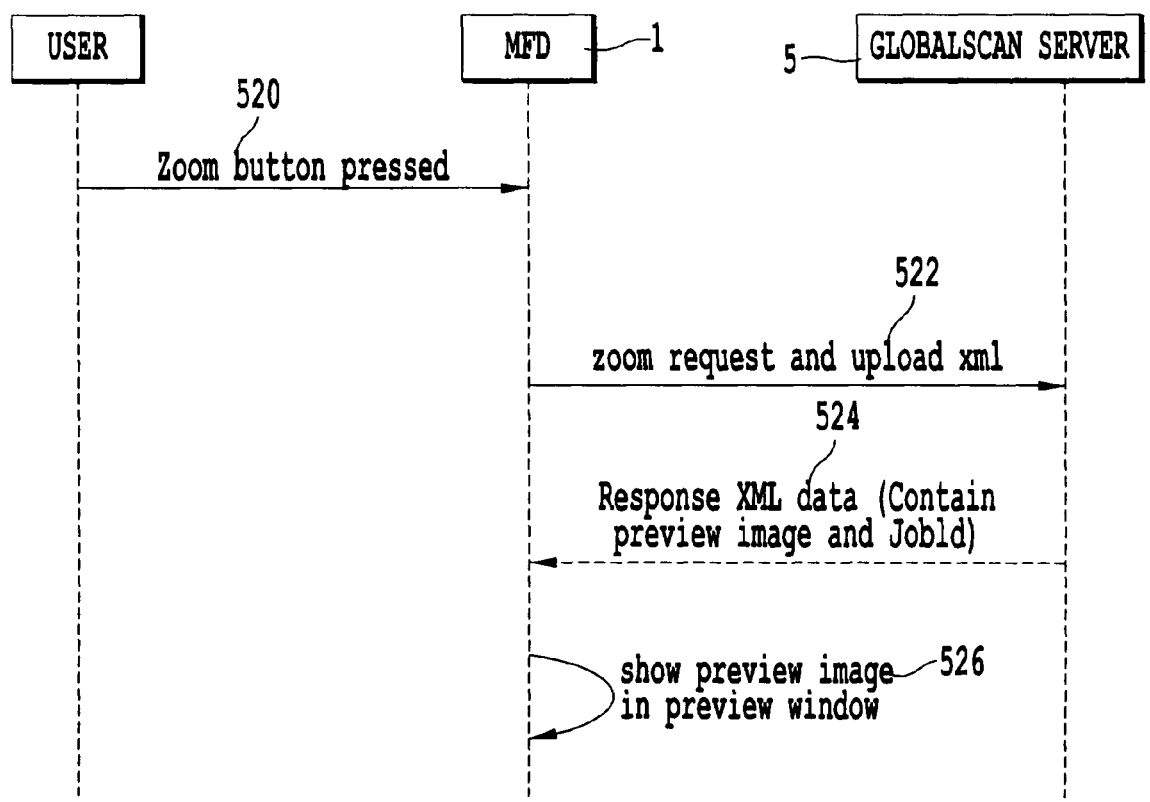
FIG. 20A is a flowchart showing the image preview zoom operation process between the user, MFD and GlobalScan server.

FIGS. 20A and 20B illustrate an interaction between the MFD 1 and the GlobalScan server 5 when the user selects a Zoom in/out function by selecting the zoom in button 48 or the zoom out button 49. Each time the user selects the zoom in 48 or zoom out 49 buttons a zoom request will be sent to the server 5. The server 5 will then crop the preview image based on the current center of the viewport coordinates and return the image to the MFD 1 for display.

FIG. 20A illustrates this process beginning with step 520 in which the zoom button is pressed by the user. Once the zoom button 48/49 is pressed, the MFD 1 forwards the zoom request and upload.xml to the server 5 in step 522. On receipt of the zoom request and upload.xml, the server 5 performs the zooming function and returns a response XML data containing the zoomed preview image and the Job ID in step 524. Finally, in step 526 the MFD 1 displays the zoomed preview image in the preview window 51.

FIG. 20B illustrates the data posted to the server 5 in lines 1-8 and the xml data returned to the MFD 1 by the server 5 in lines 10-26. In step 522 of FIG. 20A the zoom request and upload.xml data are sent to the server 5 using the APISessionMgr.aspx active server page. Appended to the APISessionMgr.aspx is the query string op=get. Additionally several options are also available to be passed in the query string, including a request_image, an image_no, a sizeX, a sizeY, a direction and a zoom option. Lines 3-8 illustrate these options. In line 7, the request image option is included. The request image (request_image) option indicates the type of image or images to return. When the option equals 0, this denotes no image. When the option equals 1, this denotes a thumbnail. When the option equals 2, this denotes a preview image. Finally, when the option equals 3, this denotes both thumbnail and preview images.

The image number (image_no) setting corresponds to the image identifier generated during the initialization call. The setting sizeX indicates the width of the viewport on the MFD 1 while the setting sizeY indicates the height of the viewport. The zoom setting specifies the zoom value desired. A zero value indicates the best fit size for the first time the preview image is shown. Different input paper may have different best-fit sizes and, as a result, zoom values for different types of input paper maybe different. Finally, the direction option shown on line 8 indicates a direction of any panning that was performed as a result of the zoom.

Lines 10-26 include an example of the XML file that is returned from the server 5 in step 524 of FIG. 20A. In line 9, the root tag opens the xml file. Line 11 includes any error codes that might be generated and in line 12 the error_description tag includes a description of any error codes that might have been generated. In line 15 the server status is returned to the MFD 1. In line 16, the xml data includes a thumbnail only tag which includes a Boolean value which is set to zero in this example. If this setting was set to 1, this would indicate that only a thumbnail and no preview image would be included in the xml file. Lines 17-21 include the preview image data. In lines 17-18 the data tag includes a type, a preview, an id, a width and height, the page type (discussed above with respect to FIG. 19B) and a zoom init value setting. Line 19 includes the preview image encoded in base64 format. Lines 22-25 include the thumbnail image and the data type and the thumbnail ID. Finally, in line 25 the xml file is closed with the close root tag.

Figure 21A:
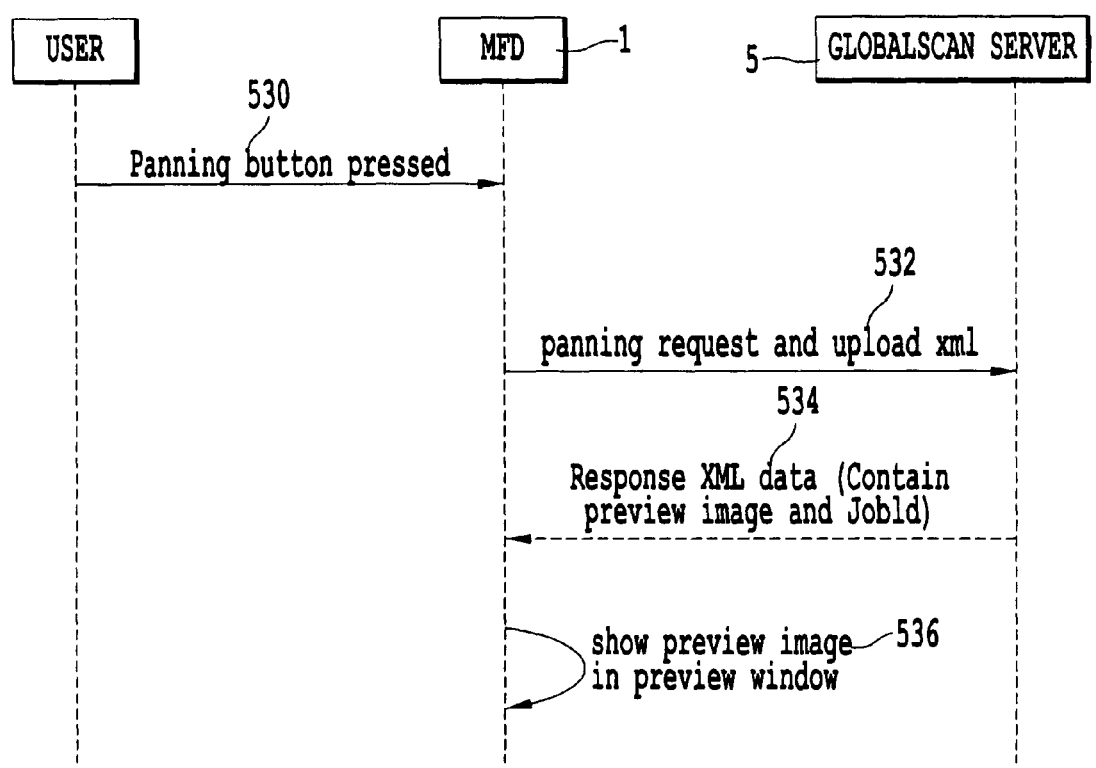
FIG. 21A is a flowchart showing the image preview pan operation process between the user, MFD and GlobalScan server.

FIGS. 21A and 21B illustrate an interaction between the MFD 1 and the GlobalScan server 5 when the user selects a pan left/right or pan up/down function by selecting the pan left/right buttons 43 or the pan up/down buttons 42. When the user zooms the preview image, the user may not be able to view the entire preview image. Thus since only part the zoomed preview image files is viewable, the preview image may need to be moved so that the user can see other parts of the zoomed image. The panning function provides the user the ability to see other parts of the image when the image is zoomed. It should be noted that in one embodiment of the invention this function is not performed on the actual image but is used only for benefit of a user using the viewfinder on the MFD 1 to preview an image. Alternatively, this function may be performed on the final image.

FIG. 21A illustrates this process beginning with step 530 in which one of the pan buttons is pressed by the user. Once the MFD 1 receives a command from the user to pan the preview image, the pan request and an upload.xml file are uploaded to the GlobalScan server 5 in step 532. Once the GlobalScan server 5 receives the pan request and the upload.xml file, the GlobalScan server 5 processes the preview image and returns a response XML data including the preview image and a Job ID in step 534. Once the MFD 1 has received the panned preview image, the preview image is displayed on the preview window 51 in step 536.

FIG. 21B illustrates the data posted to the server 5 in lines 1-7 and the xml data returned to the MFD 1 by the server 5 in lines 9-21. In step 532 of FIG. 21A, the pan request and upload.xml data are sent to the server 5 using APISession-Mgr.aspx active server page.

Appended to the APISessionMgr.aspx is the query string op=get. Additionally several options are also available to be passed in the query string, including request_image, image_no, sizeX, sizeY, zoom and direction. It should be noted that the pan function includes all the same settings as the zoom function as well as the added setting of direction. Lines 3-8 illustrate these options. In line 7, the request image option is included. The request image option indicates the type of image or images to return. When the option equals 0, this denotes no image. When the option equals 1, this denotes a thumbnail. When the option equals 2, this denotes a preview image. Finally, when the option equals 3, this denotes both thumbnail and preview images. The image number setting corresponds to the image identifier generated during the initialization call. The setting sizeX indicates the width of the viewport on the MFD 1 while the setting sizeY indicates the height of the viewport. The zoom setting, shown in line 4, specifies the zoom value desired. A zero value indicates the best fit size for the first time the preview image is shown. Different input paper may have different best-fit sizes and, as a result, zoom values for different types of input paper may be different. Finally, a direction setting found on line 8 informs the server 5 of the direction in which the user has chosen to pan the preview image. The value of 0 indicates no panning, a value of 1 indicates pan up, a value of 2 indicates pan down, a value of 3 indicates pan left and a value of 4 indicates pan right.

Lines 10-22 include an example of the XML file that is returned from the server 5 in step 534 of FIG. 21A. In line 9, the root tag opens the xml file. Line 11 includes any error codes that might be generated and in line 12 the error_description tag includes a description of any error codes that might have been generated. In lines 15 the server status is returned to the MFD 1. In line 16, the xml data includes a thumbnail only tag which includes a Boolean value which is set to zero in this example. If the setting is set to 1, this indicates that only a thumbnail and no preview image are included in the xml file. Lines 17-21 include the preview image data. In lines 17-18 the data tag includes type, preview, id, width and height, page type (discussed above with respect to FIG. 19B) and zoom init value settings. Line 19 includes the preview image itself encoded in base64. Finally, in line 22 the xml file is closed with the close root tag.

Figure 22A:
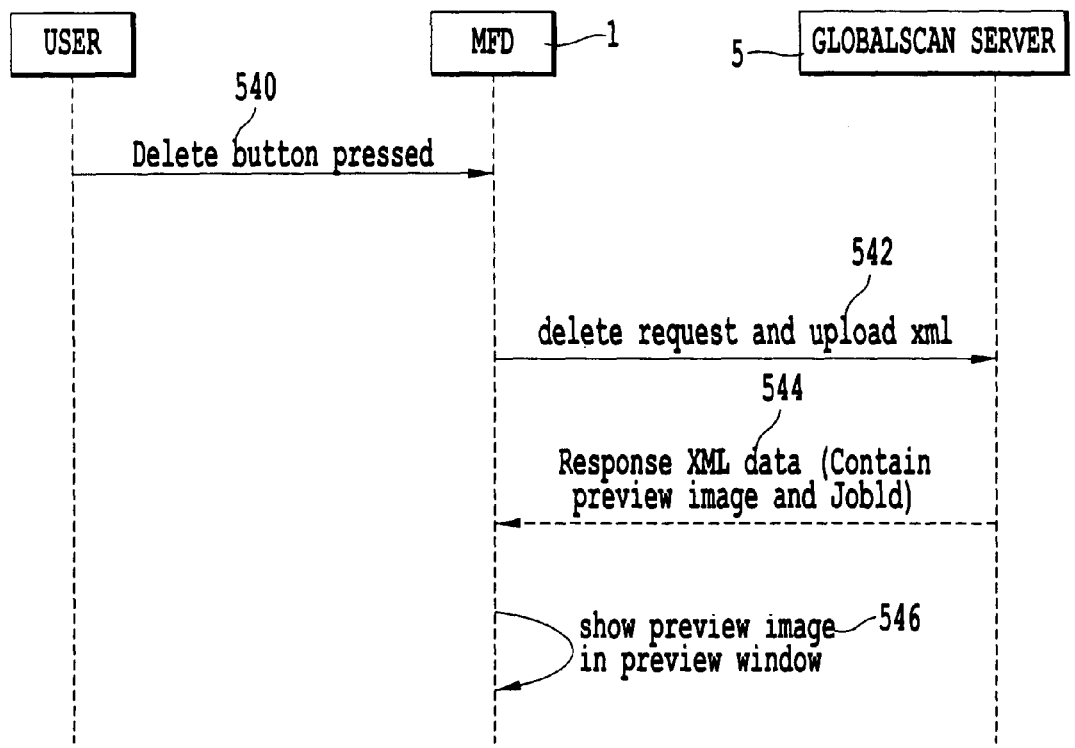
FIG. 22A is a flowchart showing the image preview delete operation process between the user, MFD and GlobalScan server.

FIGS. 22A and 22B illustrate an interaction between the MFD 1 and the GlobalScan server 5 when the user selects the delete button 50. When a user previews a page and finds that this page is not needed, the delete function can be used to remove the currently previewed page. However, selecting the delete button does not affect the image ID. When the delete button is pressed in the preview window, the MFD 1 will send a delete request to the server. After the server process the delete request, the current image will be marked for deletion in the image mapping file and the next image in line after the current image will be sent from the server. As noted earlier, if the current image is the last image in the set, the current image's predecessor will be sent from the server 5.

FIG. 22A illustrates this process beginning with step 540 in which the delete button is pressed by the user. Once the MFD 1 receives a command from the user to delete the preview image, the delete request and an upload.xml file are uploaded to the GlobalScan server 5 in step 542. Once the GlobalScan server 5 receives the delete request and the upload.xml file, the GlobalScan server 5 marks the scanned image for deletion and returns a response XML data including the next preview image and a Job ID in step 544. Once the MFD 1 has received the next preview image, the next preview image is displayed on the preview window 51 in step 546.

FIG. 22B illustrates the data posted to the server 5 in lines 1-4 and the xml data returned to the MFD 1 by the server 5 in lines 6-18. In step 542 of FIG. 22A the delete request and upload.xml data are sent to the server 5 using APISession-MGR.aspx active server page.

Appended to the APISessionMGR.aspx is the query string op=delete as well as the setting image_no. The image number (image_no) setting indicates which image number will be deleted. The image number corresponds to the image identifier generated during the initialization call.

Lines 6-18 include an example of the XML file that is returned from the server 5 in step 544 of FIG. 22A. In line 6, the root tag opens the xml file. Line 7 includes any error codes that might be generated and in line 8 the error_description tag includes a description of any error codes that might have been generated. In line 11 the server status is returned to the MFD. In line 12, the xml data includes a thumbnail only tag which includes a Boolean value which is set to zero in this example. If the setting was set to 1, this would indicate that only a thumbnail and no preview image would be included in the xml file. Lines 13-17 include the preview image data. In lines 13-14 the data tag includes the type, preview, the id, the width and height, the page type (discussed above with respect to FIG. 19B) and zoom init value settings. Line 15 includes the next preview image itself encoded in base64. Finally, in line 18 the xml file is closed with the close root tag.

Figure 23A:
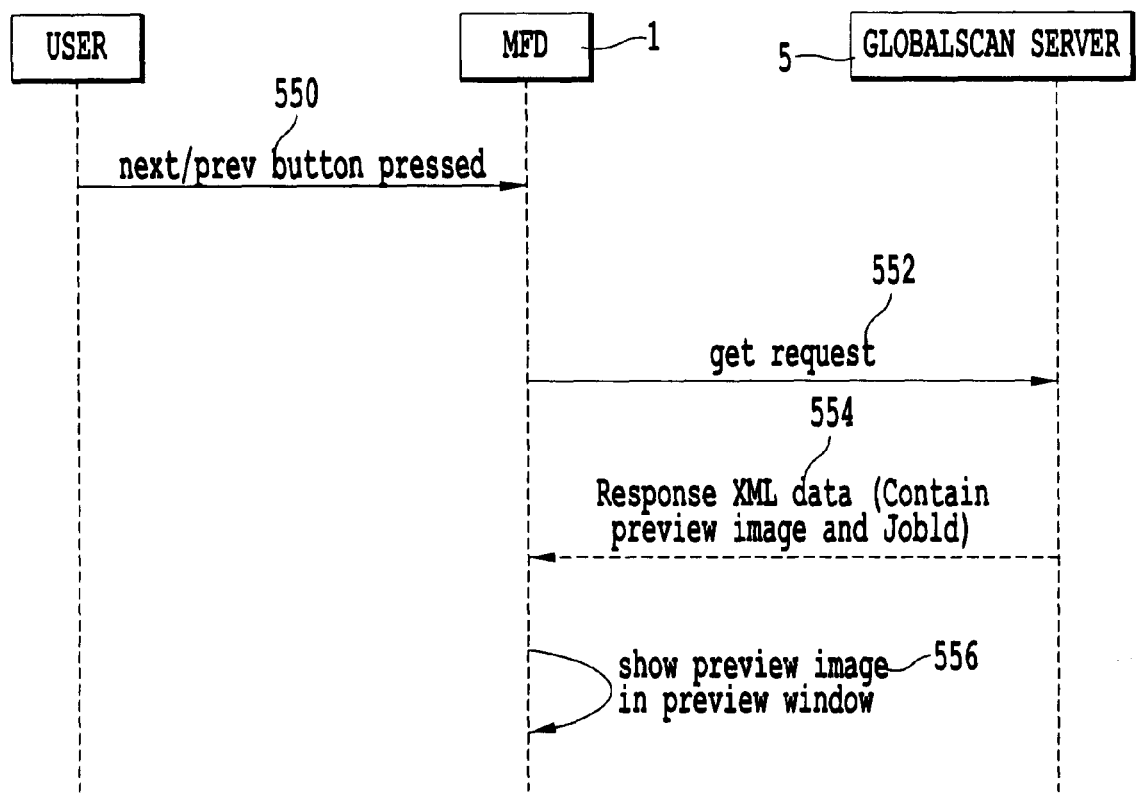
FIG. 23A is a flowchart showing the image preview next/previous operation process between the user, MFD and GlobalScan server.

FIGS. 23A and 23B illustrate an interaction between the MFD 1 and the GlobalScan server 5 when the user selects the previous button 44 or the next button 45. In the preview window 51 the customer may only be able to see one page, however the user may want to see the current page's previous and next pages. Accordingly, the previous and next functions enable to user to slide between pages without returning to the thumbnail selection window 34. Each time the previous 44 or next 45 button is selected, a get request is sent to the server 5 from the MFD 1.

FIG. 23A illustrates this process beginning with step 550 in which the next/prev button is pressed by the user. Once the MFD 1 receives a command from the user to go to the next or previous page, a get request and an upload.xml file are uploaded to the GlobalScan server 5 in step 552. Once the GlobalScan server 5 receives the get request and the upload.xml file, the GlobalScan server 5 then returns a response XML data including the next or previous preview image and a Job ID in step 554. Once the MFD 1 has received the next preview image, the next preview image is displayed on the preview window 51 in step 556. It should be noted that in one embodiment of the invention if the user is on the last image in a set, the next button returns the first image in the set. Alternatively, in another embodiment the system indicates that there is no previous or next image.

FIG. 23B illustrates the data posted to the server 5 in lines 1-8 and the xml data returned to the MFD 1 by the server 5 in lines 10-26. In step 552 of FIG. 23A, the get request and upload.xml data are sent to the server 5 using the APISessionMGR.aspx active server page.

Appended to the APISessionMGR.aspx is the query string op=get as well as a number of settings. The several options that are available to be passed in the query string include request_image, image_no, sizeX, sizeY, direction and zoom. Lines 3-8 illustrate these options. In line 7, the request image option is included. The request image option indicates the type of image or images to return. When the option equals 0, this denotes no image. When the option equals 1, this denotes a thumbnail. When the option equals 2, this denotes a preview image. Finally, when the option equals 3, this denotes both thumbnail and preview images.

The image number setting, found in line 3, corresponds to the image identifier generated during the initialization call. The setting sizeX indicates the width of the viewport on the MFD 1 while the setting sizeY indicates the height of the viewport. The direction setting indicates a direction of any pan that may need to be performed. Finally the zoom setting, found on line 4, specifies the zoom value desired. A zero value indicates the best fit size for the first time the preview image is shown. Different input paper may have different best-fit sizes and, as a result, zoom values for different types of input paper maybe different.

Lines 10-26 include an example of the XML file that is returned from the server 5 in step 554 of FIG. 23A. In line 10, the root tag opens the xml file. Line 11 includes any error codes that might be generated and in line 12 the error_description tag includes a description of any error codes that might have been generated. In line 15 the server status is returned to the MFD 1. In line 16, the xml data includes a thumbnail only tag which includes a Boolean value which is set to zero in this example. If the setting is set to 1, this indicates that only thumbnails and no preview image would be included in the xml file. Lines 17-21 include the preview image data. In lines 17-18 the data tag includes type, preview, id, width and height, page type (discussed above with respect to FIG. 19B) and zoom init value settings. Line 19 includes the next or previous preview image encoded in base64. Lines 22-25 include the thumbnail data corresponding to the preview image included in line 19. In addition, the thumbnail image data is found in line 23. Finally, in line 26 the xml file is closed with the close root tag.

Figure 24A:
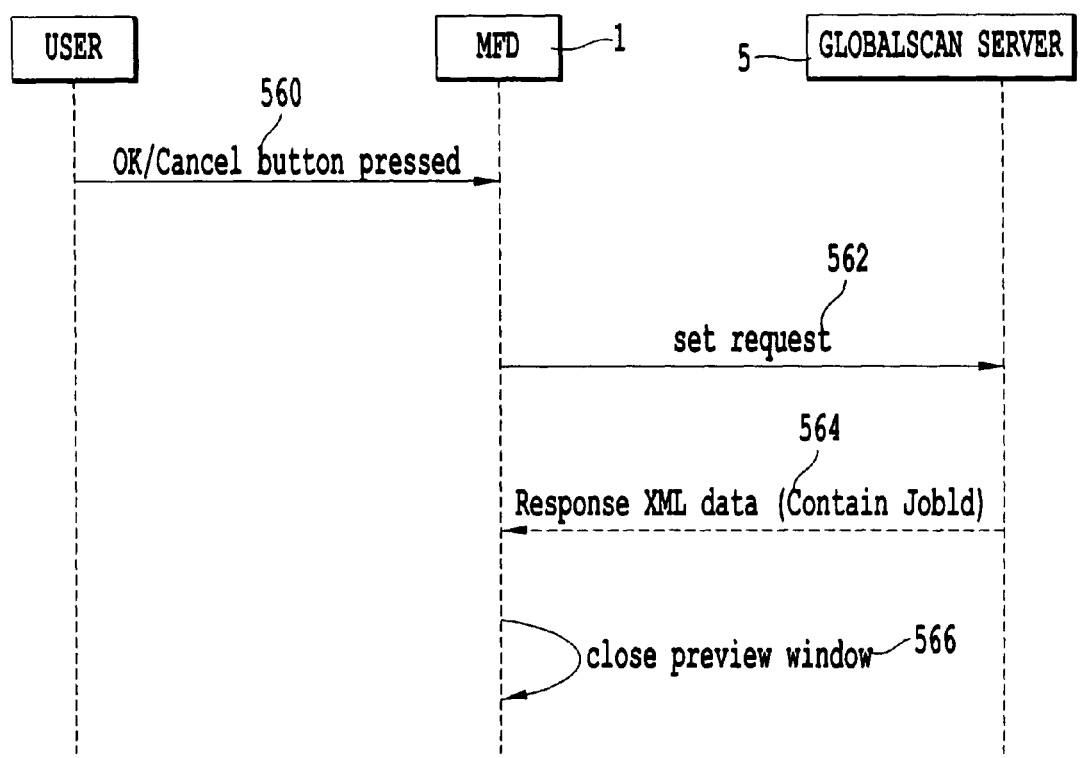
FIG. 24A is a flowchart showing the image preview submit or cancel operation process between the user, MFD and GlobalScan server.

FIGS. 24A and 24B illustrate an interaction between the MFD 1 and the GlobalScan server 5 when the user selects the restore 31, cancel 32 and submit 33 buttons.

When the submit button 33 is selected, a set function is called by the MFD 1. The set function is used to confirm the changes that have been made in the preview window. Once the user has made all the changes to the scanned image set the user needs to confirm the changes. When the submit button is selected, the set function is called and the server 5 makes all the changes to the original image.

FIG. 24A illustrates this process beginning with step 560 in which the submit button 33 is pressed by the user. Once the MFD 1 receives a command from the user to submit the changes, the set request and an upload.xml file are uploaded to the GlobalScan server 5 in step 562. Once the GlobalScan server 5 receives the set request and the upload.xml file, the GlobalScan server 5 then returns response XML data including a Job ID in step 564. Once the MFD 1 has received the xml data, the preview window is closed in step 566.

FIG. 24B illustrates the code used by the server 5 and the MFD 1 after the submit 33, cancel 32 and restore 31 buttons are selected.

With respect to the submit button 33, FIG. 24B illustrates the data posted to the server 5 in line 1 and the xml data returned to the MFD 1 by the server 5 in lines 1-8. In step 562 of FIG. 24A the set request and upload.xml data are sent to the server 5 using the APISessionMgr.aspx active server page. Appended to the APISessionMgr.aspx is the query string op=set.

Although not shown in FIG. 24B an example of the XML file that is returned from the server 5 in step 564 of FIG. 24A is described below. First, the root tag opens the xml file. Next is included any error codes that might be generated and an error_description tag includes a description of any error codes that might have been generated. Next the server status is returned to the MFD 1, the server status tag is used to communicate to the MFD 1 that the set operation is complete. Finally, the close root tag closes the xml file.

With respect to the cancel button 32, FIG. 24B illustrates the data posted to the server 5 in lines 4-5 when the cancel button is selected. When the user selects the cancel button, the preview operation is cancelled and the user loses all the scanned image files. The operation is called using the APISessionMgr.aspx active server page with the appended query string op=cancel. When the server 5 receives this command, the job is erased and the server returns an XML file which includes the server status similar to the submit operation described previously.

With respect to the restore button 31, FIG. 24B illustrates the data posted to the server 5 in lines 7-8 and the xml data returned to the MFD 1 by the server 5 in lines 10-27. When the user selects the restore button, an undo operation is initialized that undoes all the preview operations previously performed and returns the scan job back to the original initialized status. The operation is called using the APISessionMgr.aspx active server page with the appended query string op=restore.

Lines 10-37 include an example of the XML file that is returned from the server 5 in response to the restore call. The restore call places the MFD 1 in the same position as the MFD 1 was at the time of the original initialization command.

In line 10, the root tag opens the xml file. Line 11 includes any error codes that might be generated and in line 12 the error_description tag includes a description of any error codes that might have been generated. In line 15 the server status is returned to the MFD 1. In line 16, the total page number includes the total number of images or pages scanned in the batch job. In line 17, the page_number tag includes the number of pages selected for the operation. In line 18, the xml data includes a thumbnail only tag which includes a Boolean value which is set to 1 in this example. If the setting was set to 0, this would indicate that no preview image would be included in the xml file.

Lines 19-22 and lines 23-26 include examples of thumbnails with ID numbers of 1 and 2 respectively. Also included inside the data tag is the page type tag (discussed above with respect to FIG. 19B) In addition, the thumbnail image data is found in lines 20 and 24. Finally, in line 27 the xml file is closed with the close root tag.

In addition, in another embodiment of the present invention, a user is able to undo a single operation instead of every operation performed by the user if the operation is a mistake or the user decides that the change operation is not needed.

Further, in another embodiment of the present invention the user is able to insert images in the scan job if during preview the user realizes an image or page is missing. These images may be inserted by scanning an input document or using an image previously stored on the GlobalScan server 5, the MFD 1 or some other networked storage device.

In another embodiment of the present invention, the preview page range dropdown box 19a may include an option entitled auto-detect. This option allows the MFD 1 or server 5 to detect which pages should be available for image preview. This determination can be made based on percentage of stray copy marks or if the majority of the job has one orientation while a few pages have a different orientation. In addition, the auto-detect could detect the presence of water-marks or barcodes that may cause a problem to the user.

Figure 25:
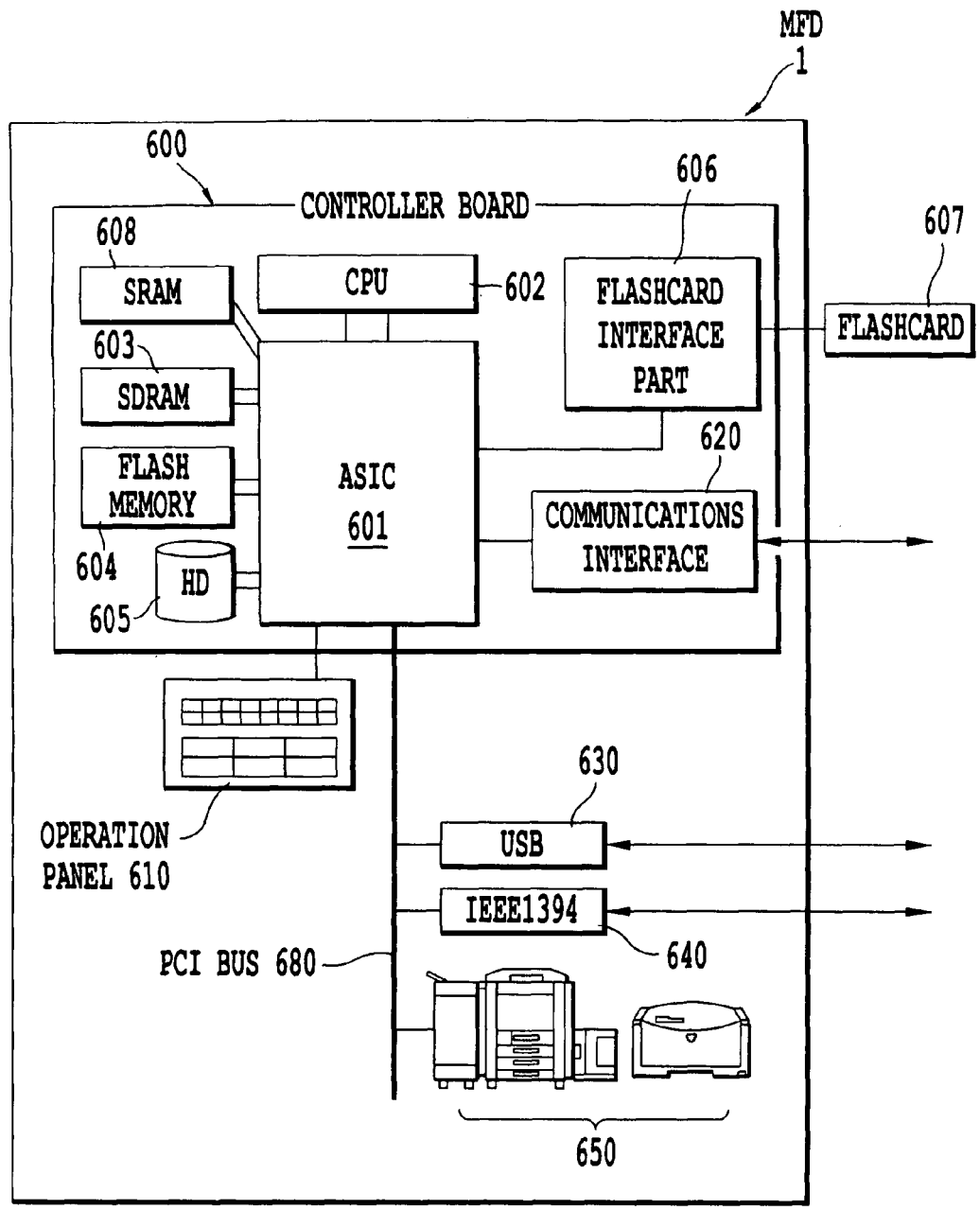
FIG. 25 is a hardware configuration of the image forming apparatus according to an embodiment of the present invention.

FIG. 25 shows an example of a hardware configuration of the MFD 1 according to an embodiment of the present invention. As shown in FIG. 25, the MFD 1 includes a controller board 600, an operation panel 610, a fax control unit (FCU) 620, a USB 630, an IEEE 1394 port 640, and a printer 650. It should be also noted that other types of I/O interfaces could be included including IEEE 1394b, USB 2.0. The controller board 600 includes a CPU 602 for processing and several storage devices such as SDRAM 603, SRAM 608, flash memory (flash ROM) 604, flash card interface part 606 and HD 605 used to store data associated with the MFD 1. Each of these components are connected to the ASIC 601, the ASIC 601 is an application specific integrated circuit that is designed specifically for use in a MFP 699. Other types of storage devices are also possible as well as other types of data processors and integrated circuits. The operation panel 610 is directly connected to the ASIC 601 as is the communications interface 620. The communications interface 620 can also be connected to a network or any other similar type communications medium. The USB 630, the IEEE 1394 640 and the multi-function printer functions 650 such as scanning, printing, and faxing are connected to the ASIC 601 via the PCI bus 680.

The SRAM 608 is a nonvolatile RAM; other types of SRAM are also possible. A flashcard 607 can be inserted into a flash card interface part 606, so that data is sent/received between the ASIC 601 and the flashcard 607 via the flash card interface part 606.

The operation panel 610 includes an operation part used for key operation such as key input and button pushing and the like by the user, and a display part for displaying drawing data such as various screens. It should be appreciated that other types of hardware components can be used in the present invention.

Further with respect to a computer readable medium such as a floppy disk, magnetic tape, CD-ROM and the like, by installing the program stored in the computer readable medium into an MFD, the MFD can perform the functions of the present invention.

In addition, several different types of bitmap image can be used in the present invention including, but not limited to, 24-bit bitmap, 256 color bitmap, 16 color bitmap and monochrome bitmap. These types of bitmaps are smaller and do not incur the network overhead that other types of image files might incur.

This invention has been described with respect to a multi-function device such as is described above with respect to FIG. 25, but is applicable to any image processing device such as a copier, digital copier, printer, scanner, fax machine, or multi-function printer or any combination thereof. Moreover, the invention is applicable to other special purpose devices such as navigation systems, global positioning systems, vending machines, metering systems, machine tools and other tools which operate using programming or a programmed processor, automobiles, other transportation devices such as trains, motorcycles, planes, or boats, radar systems, radios, MP3 players, digital music players, and other audio systems, mobile phones, other communication devices and systems, and any other special purpose device which operates using a plug-in.

The present invention is not limited to the specifically disclosed embodiments, and variations and modifications may be made without departing from the scope of the present invention. Obviously, numerous modifications and variations of the present invention are possible in light of the above teachings. It is therefore to be understood that within the scope of the appended claims, the invention may be practiced otherwise than as specifically described herein.

The invention claimed is:

1. A method of modifying images, comprising:
scanning, with a multi-function device, at least one document having multiple pages to create a plurality of images corresponding to the pages of the at least one document;
storing the plurality of images on a remote server;
creating at least one thumbnail image from the plurality of images stored on the remote server, each thumbnail image corresponding to a page of the at least one document;
displaying the at least one thumbnail image to a user;
selecting a thumbnail image based on user input;
displaying a preview image of the at least one of the pages of the scanned document, the preview image corresponding to the selected thumbnail image;
displaying a selectable graphical indicia corresponding to at least one operation for modifying the preview image;
selecting the selectable graphical indicia based on user input;
modifying the preview image in accordance with the selected graphical indicia to create a modified preview image;
displaying the modified preview image;
receiving confirmation of a change displayed in the modified preview image; and
in response to receiving the confirmation of the modified preview image, modifying the corresponding image in the plurality of images stored on the remote server in accordance with the selected graphical indicia.

2. The method of modifying images according to claim 1, wherein the at least one operation for modifying includes one of a zoom, pan, undo, insert, rotate or delete operation.

3. The method of modifying images according to claim 1, wherein the at least one thumbnail image comprises a plurality of thumbnail images.

4. The method of modifying images according to claim 3, wherein a number of the plurality of thumbnail images is set by user input.

5. The method of modifying images according to claim 4, wherein the number of the plurality of thumbnail images is set by user input selecting an option from a limited number of predetermined options.

6. The method of modifying images according to claim 1, wherein the step of modifying the corresponding image in the plurality of images stored on the remote server is performed at the remote server.

7. The method of modifying images according to claim 1, wherein the step of modifying the preview image is performed at the remote server.

8. The method of modifying images according to claim 1, wherein the step of modifying the preview image is performed by the multi-function device.

9. The method of modifying images according to claim 1, further comprising:
performing the steps of selecting the selectable graphical indicia, modifying the preview image, and displaying the modified preview image a plurality of times in a single preview session before the step of receiving confirmation of the change; and
tracking a history of operations made in the single preview session, the modifying the corresponding image in the plurality of images being performed in accordance with the tracked history of operations.

10. A method of modifying images, comprising:
scanning, with a multi-function device, at least one document having multiple pages to create a plurality of images corresponding to the pages of the at least one document;
storing the plurality of images on a remote server;
displaying a preview image of at least one of the pages of the scanned document;
displaying a selectable graphical indicia corresponding to at least one operation for modifying the preview image;
selecting the selectable graphical indicia based on user input;
modifying the preview image in accordance with the selected graphical indicia to create a modified preview image;
displaying the modified preview image;
receiving confirmation of a change displayed in the modified preview image; and
in response to receiving the confirmation of the modified preview image, modifying the corresponding image in the plurality of images stored on the remote server in accordance with the selected graphical indicia.

11. The method of modifying images according to claim 10, further comprising:
displaying a thumbnail image of at least one of the pages of the scanned document; and
selecting a thumbnail image based on user input.

12. The method of modifying images according to claim 11, wherein the displayed preview image of at least one of the pages of the scanned document is displayed in accordance with the selecting a thumbnail image based on user input.

13. The method of modifying images according to claim 11, wherein each displayed preview image corresponds to a selected thumbnail image.

14. The method of modifying images according to claim 10, wherein the step of modifying of the corresponding image in the plurality of images stored on the remote server is performed at the remote server.

15. The method of modifying images according to claim 10, wherein the step of modifying the preview image is performed at the remote server.

16. The method of modifying images according to claim 10, wherein the step of modifying the preview image is performed by the multi-function device.

17. The method of modifying images according to claim 10, wherein the at least one operation for modifying includes at least one of a zoom, pan, undo, insert, rotate or delete operation.

18. The method of modifying images according to claim 10, further comprising:
performing the steps of selecting the selectable graphical indicia, modifying the preview image, and displaying the modified preview image a plurality of times in a single preview session before the step of receiving confirmation of the change; and
tracking a history of operations made in the single preview session, the modifying the corresponding image in the plurality of images being performed in accordance with the tracked history of operations.

19. An image processing device, comprising:
a scanner configured to produce a plurality of images corresponding to the pages of at least one document having multiple pages;
a communications interface configured to connect the image processing device to a remote server via a network, to transmit the plurality of images to the remote server for storage, and to receive from the remote server at least one thumbnail image, each thumbnail image corresponding to a page of the at least one document;
a display unit configured to display the at least one thumbnail image, at least one preview image corresponding to the at least one thumbnail image, and at least one modified preview image corresponding to the at least one preview image;
a user interface configured to display a selectable graphical indicia corresponding to at least one operation for modifying the at least one preview image of the scanned document and to accept input from a user selecting the graphical indicia; and
a modification unit configured to modify the at least one preview image to create the at least one modified preview image in accordance with a selected graphical indicia,
wherein the user interface is further configured to accept a confirmation of a change displayed in the at least one modified preview image, and
wherein the remote server modifies the stored plurality of images in accordance with the selected graphical indicia.

20. The image processing device according to claim 19, wherein the modification unit is configured to perform at least one of a zoom, pan, undo, insert, rotate or delete.

21. The image processing device according to claim 19, wherein the at least one thumbnail image is a user selectable image.

22. The image processing device according to claim 19, wherein the user interface is part of the display unit.

23. An image processing device, comprising:
a scanner configured to produce a plurality of images corresponding to the pages of at least one document having multiple pages;
a communications interface configured to connect the image processing device to a remote server via a network and to transmit the plurality of images to the remote server for storage;

a display unit configured to display at least one preview image, each preview image corresponding to a page of the at least one document, and to display at least one modified preview image, each modified preview image corresponding to the at least one preview image;

a user interface configured to display a selectable graphical indicia corresponding to at least one operation for modifying the at least one preview image and to accept input from a user selecting the graphical indicia; and a modification unit configured to modify the at least one preview image to create the at least one modified preview image in accordance with a selected graphical indicia, wherein the user interface is further configured to accept a confirmation of a change displayed in the at least one modified preview image, and wherein the remote server modifies the stored plurality of images in accordance with the selected graphical indicia.

24. The image processing device according to claim 23, wherein the modification unit is further configured to perform at least one of a zoom, pan, undo, insert, rotate or delete.

25. The image processing device according to claim 23, wherein the user interface is part of the display unit.

26. A non-transitory computer readable storage medium storing program code that when executed by an image processing device causes the image processing device to perform a method, comprising:

scanning at least one document having multiple pages to create a plurality of images corresponding to the pages of the at least one document;

transmitting the plurality of images to a remote server for storage;

receiving at least one thumbnail image from the remote server, each thumbnail image corresponding to a page of the at least one document;

displaying the at least one thumbnail image to a user;

displaying a preview image of the at least one of the pages of the scanned document, the preview image corresponding to the selected thumbnail image;

displaying a selectable graphical indicia corresponding to at least one operation for modifying the preview image;

selecting the selectable graphical indicia based on user input;

modifying the preview image in accordance with the selected graphical indicia to create a modified preview image;

displaying the modified preview image;

receiving a confirmation of a change displayed in the modified preview image; and in response to receiving the confirmation of the modified preview image, instructing the remote server to modify the corresponding image in the plurality of images stored on the remote server in accordance with the selected graphical indicia.

27. A non-transitory computer readable storage medium storing program code that when executed by an image processing device causes the image processing device to perform a method, comprising:

scanning, with a multi-function device, at least one document having multiple pages to create a plurality of images corresponding to the pages of the at least one document;

transmitting the plurality of images to a remote server for storage;

displaying a preview image of at least one of the pages of the scanned document;

displaying a selectable graphical indicia corresponding to at least one operation for modifying the preview image;

selecting the selectable graphical indicia based on user input;

modifying the preview image in accordance with the selected graphical indicia to create a modified preview image;

displaying the modified preview image;

receiving a confirmation of a change displayed in the modified preview image; and in response to receiving the confirmation of the modified preview image, modifying the corresponding image in the plurality of images stored on the remote server in accordance with the selected graphical indicia.

28. An image processing device, comprising:

means for scanning at least one document having multiple pages to produce a plurality of images corresponding to the multiple pages;

means for transmitting the plurality of images to a remote server for storage and for receiving at least one thumbnail image from the remote server, each thumbnail image corresponding to a page of the at least one document;

means for displaying the at least one thumbnail image, at least one preview image corresponding to the at least one thumbnail image, and at least one modified preview image corresponding to the at least one preview image;

means for displaying a selectable graphical indicia corresponding to at least one operation for modifying the at least one preview image, and for accepting user input from a user selecting the graphical indicia; and means for modifying the at least one preview image to create the at least one modified preview image in accordance with a selected graphical indicia, wherein the means for displaying a selectable graphical indicia is further a means for accepting a confirmation of a change displayed in the at least one modified preview image, and the remote server modifies the stored plurality of images in accordance with the selected graphical indicia.

29. An image processing device, comprising:

means for scanning at least one document having multiple pages to produce a plurality of images corresponding to the multiple pages;

means for transmitting the plurality of images to a remote server for storage;

means for displaying a preview image of at least one of the pages of the scanned document and a modified preview image corresponding to the preview image;

means for displaying a selectable graphical indicia corresponding to at least one operation for modifying the preview image and for accepting user input from a user selecting the graphical indicia; and means for modifying the preview image to create the modified preview image in accordance with a selected graphical indicia, wherein the means for displaying a selectable graphical indicia further being a means for accepting a confirmation of a change displayed in the modified preview image, and the remote server modifies the stored plurality of images in accordance with the selected graphical indicia.

* * * * *